United States Patent
Fukatani et al.

(10) Patent No.: US 8,554,808 B2
(45) Date of Patent: Oct. 8, 2013

(54) FILE MANAGEMENT SUB-SYSTEM AND FILE MIGRATION CONTROL METHOD IN HIERARCHICAL FILE SYSTEM

(75) Inventors: Takayuki Fukatani, Kawasaki (JP); Hitoshi Kamei, Sagamihara (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 412 days.

(21) Appl. No.: 12/666,680

(22) PCT Filed: Nov. 6, 2009

(86) PCT No.: PCT/JP2009/005912
§ 371 (c)(1),
(2), (4) Date: Dec. 24, 2009

(87) PCT Pub. No.: WO2011/055412
PCT Pub. Date: May 12, 2011

(65) Prior Publication Data
US 2011/0213814 A1    Sep. 1, 2011

(51) Int. Cl.
*G06F 12/00*    (2006.01)
*G06F 17/30*    (2006.01)

(52) U.S. Cl.
USPC ........................................... 707/821

(58) Field of Classification Search
USPC ........................................... 707/821
See application file for complete search history.

(56) References Cited

U.S. PATENT DOCUMENTS

| | | | |
|---|---|---|---|
| 5,873,103 A | 2/1999 | Trede et al. | |
| 7,093,088 B1 * | 8/2006 | Todd et al. | 711/162 |
| 7,194,505 B2 * | 3/2007 | Yano et al. | 709/203 |
| 2004/0049553 A1 * | 3/2004 | Iwamura et al. | 709/213 |
| 2004/0193760 A1 | 9/2004 | Matsunami et al. | |
| 2005/0240636 A1 | 10/2005 | Shitomi et al. | |
| 2008/0222158 A1 | 9/2008 | Saika | |

FOREIGN PATENT DOCUMENTS

| | | |
|---|---|---|
| EP | 1 840 723 A2 | 10/2007 |
| WO | 2004/025404 A2 | 3/2004 |

OTHER PUBLICATIONS

U.S. Appl. No. 12/348,339, filed Jan. 2, 2009 in the name of Kamei et al.

* cited by examiner

*Primary Examiner* — James Trujillo
*Assistant Examiner* — Jeffrey Chang
(74) *Attorney, Agent, or Firm* — Mattingly & Malur, PC

(57) ABSTRACT

A file management sub-system executes file migration without causing an unintended drop in the response time or the like. When a management computer issues a file migration direction, a file storage apparatus notifies client computer associated with a migration target file that file migration is scheduled. When postponement or suspension of file migration is requested by the client computer, the file migration is postponed or suspended.

19 Claims, 22 Drawing Sheets

FIG.9

Hierarchical Management Table — 1370

| storage name (1370A) | file system name (1370B) | type (1370C) | mount path (1370D) |
|---|---|---|---|
| nas1 | nas_fs1 | normal | /tier1 |
| worm1 | worm_fs | tape | /tier2 |
| tape1 | tape_fs | maid | /tier3 |

FIG.10

File Management Table 1380

| real file path 1380A | export path 1380B |
|---|---|
| /tier1/dir1 | /dir1 |
| /tier1/dir2 | /dir2 |
| /tier1/dir3 | /dir3 |

FIG.11

Client Management Table — 1395

| export path (1395A) | client computer name (1395B) |
|---|---|
| /dir1 | client1, client2, client3 |
| /dir2 | client1 |
| /dir3 | client2 |

FIG.12

Migration Management Table

| export path | ID | client computer name | source | destination | status | start time |
|---|---|---|---|---|---|---|
| /dir2 | 1 | client1 | /tier1/dir2 | /tier2/dir2 | finished | 23:00 |
| /dir3 | 2 | client1 | /tier1/dir3 | /tier3/dir3 | cancel | 23:00 |

Migration File Table — 1251

| file path (1251A) | Status (1251B) | retry count (1251C) |
|---|---|---|
| /dir2 | Processing | 0 |
| /dir3 | Retrying | 2 |

FIG.14

| export path | destination | force bit |
|---|---|---|
| /dir2 | tape | 0 |
| /dir3 | tape | 1 |

| export path | ID | source type | destination type | start time | force bit |
|---|---|---|---|---|---|
| /dir2 | 1 | normal | tape | 23:00 | 0 |
| /dir3 | 2 | normal | tape | 23:00 | 1 |

| file path | ID | Request |
|---|---|---|
| /dir2 | 1 | WAIT |
| /dir3 | 2 | CANCEL |

2200A — file path column
2200B — ID column
2200C — Request column
2200 — table ved-destination information specifying the movement-destination storage device, and the migration start time, and sends the migration information to all or at least one of the plurality of client computers via the first communication interface.

FILE MANAGEMENT SUB-SYSTEM AND FILE MIGRATION CONTROL METHOD IN HIERARCHICAL FILE SYSTEM

TECHNICAL FIELD

The present invention relates to a file management sub-system and to a file migration control method in a hierarchical file system.

BACKGROUND ART

As a network file system, Network attached storage (NAS) is known. In recent years, a system that employs a mixture of storage devices with various access characteristics in addition to NAS has also been proposed.

Examples of storage devices with a variety of access characteristics that may be mentioned include Write Once Read Many (WORM) devices, tape devices, and a Massive Array of Idle Disks (MAID). In the case of a WORM device, update processing is not allowed after initial write processing. Hence, data that has been written to a WORM device cannot be deleted or falsified. In the case of MAID, power consumption is reduced by stopping or decreasing disk rotation in the period of no disk access.

Expectations for hierarchical file systems have risen. For instance, by making combined use of a plurality of such storage devices with different access characteristics, files are stored in an optimum storage device according to the importance or usage characteristics of the files (Patent Literature 1).

CITATION LIST

Patent Literature

US2004/0193760A1

SUMMARY OF INVENTION

Technical Problem

The hierarchical file system of the above Patent Literature provides the user with a transparent file migration function. By using the file migration function, a file storage location can be changed without the user being aware of the change. In other words, the actual storage destination of the file can be optimized without changing the access path with which a client computer accesses the file.

However, when user-transparent file migration is executed, the access characteristic or file operation of a migration target file before and after the file migration is executed may vary largely.

For example, when a file is moved from NAS to a tape device or MAID device, the response time of file access drops sharply. This is because a tape device typically has a slower access speed than a disk. In the case of a MAID, this is because it takes time for a disk in a dormant state to be returned to a read/writable state.

Furthermore, in a case where a file is moved from the NAS to a WORM device, for example, the file cannot be subsequently updated. This is because a WORM device is a device that prohibits data deletion or falsification.

A computer that issues a file migration direction knows what kind of storage device a file is to be stored in, and hence there is no particular inconvenience caused. However, for other computers using the file, an unintended change in the access characteristic or an unintended change in the file operability occurs as a result of the file migration. An unintended change in the access characteristic is, for example, a poorer response time. An unintended change in file operability is the denial of file updates, for example.

Hence, other computers excluding the computer that issued the file migration direction are likely to be unexpectedly affected since files these computers are using are moved without their knowledge.

Hence, an object of the present invention is to provide a file management sub-system and a file migration control method in a hierarchical file system configured such that, even in a case where a file used by a plurality of computers is moved between a plurality of storage devices, unintended adverse effects on the computers can be suppressed. Further objects of the present invention will become apparent from the subsequent embodiments.

Solution to Problem

In order to solve the above problems, a file management sub-system according to a first aspect of the present invention is a file management sub-system which unifies respective file systems of a plurality of storage devices and supplies a unified file system to a plurality of client computers, the file management sub-system comprising: a microprocessor; a memory for storing a computer program to be read and executed by the microprocessor; a first communication interface with which the microprocessor communicates with the plurality of client computers; and a second communication interface with which the microprocessor communicates with the plurality of storage devices, wherein the microprocessor, by executing the computer program, sends migration information, which includes information relating to file migration, to all or at least one of the plurality of client computers via the first interface on the basis of a first direction received from a direction source directing execution of the file migration.

A second aspect is the file management sub-system according to the first aspect, wherein the plurality of storage devices are configured as storage devices of a plurality of types having different input/output characteristics; a hierarchical file system is generated by unifying the respective real file systems of the plurality of storage devices in a single virtual file system and then hierarchizing the plurality of real file systems and the single virtual file system; the plurality of client computers include a management computer which serves as the direction source and manages at least one file migration; the management computer creates the first direction, which includes migration target information specifying a migration target file included in the hierarchical file system, movement destination information specifying, among the plurality of storage devices, a type of a storage device serving as a movement destination of the migration target file, and forced execution information indicating whether or not the migration target file is to be migrated compulsorily to the movement-destination storage device; and wherein the microprocessor: (1) upon receipt of the first direction from the management computer via the first communication interface, selects the movement-destination storage device from among the plurality of storage devices on the basis of the movement-destination information; (2) determines a migration start time indicating a time for moving the migration target file to the movement-destination storage device; (3) creates the migration information, which includes the migration target information, migration identification information identifying migration of the migration target file, movement source information specifying, among the storage devices, a movement-source storage device in which the migration target file is stored, the movement-destination information, the migration start time, and the forced execution information, and sends the migration information to each client computer excluding the management computer among the plurality of client computers; (4) receives, from each of the client computers receiving the migration information, response information which includes the migration target information, the migration identification information, and request information indicating a request relating to migration of the migration target file; (5) in a case where the request information requests suspension of the migration of the migration target file, suspends the migration of the migration target file; (6) in a case where the request information requests postponement of the migration of the migration target file, postpones the migration of the migration target file until cancellation of the postponement is directed by the client computer which issues the request information; (7) even in a case where postponement or suspension of the migration of the migration target file is requested by the request information, compulsorily migrates the migration target file to the movement-destination storage device in a case in which the forced execution information requests forced migration of the migration target file; and (8) notifies the management computer in a case where there is a migration target file for which migration has been suspended in accordance with the request information.

A third aspect is the file management sub-system according to the first aspect, wherein the microprocessor determines the file migration execution time on the basis of the first direction, and sends, before the execution time arrives, the migration information via the first interface to each of the client computers excluding the direction source among the plurality of client computers.

A fourth aspect is the file management sub-system according to the first aspect, wherein the microprocessor sends a second direction relating to the file migration via the second communication interface to a predetermined storage device that is associated with the file migration among the plurality of storage devices, on the basis of response information from the client computer which has received the migration information among the plurality of client computers.

A fifth aspect is the file management sub-system according to the fourth aspect, wherein, in a case where suspension or postponement of file migration is requested by the response information, the microprocessor suspends or postpones the file migration.

A sixth aspect is the file management sub-system according to the fifth aspect, wherein the client computer which has received the migration information, in a case where judgment is made that there is predetermined processing to be performed on the migration target file before the file migration is executed, creates the response information requesting postponement of the file migration until the predetermined processing is complete, and sends the response information to the microprocessor, and the client computer subsequently executes the predetermined processing and, after the predetermined processing is complete, notifies the microprocessor of cancellation of postponement of the file migration.

A seventh aspect is the file management sub-system according to the sixth aspect, wherein the first direction includes forced execution information indicating whether or not the migration target file is to be compulsorily migrated; and, in a case where the forced execution information requests forced migration of the migration target file, the migration target file is migrated even in a case where suspension or postponement of migration of the migration target file has been requested by the response information.

An eighth aspect is the file management sub-system according to the first aspect, wherein the microprocessor generates a hierarchical file system by unifying file systems of the plurality of storage devices in a single file system, and supplies the hierarchical file system to the plurality of client computers.

A ninth aspect is the file management sub-system according to the first aspect, wherein the direction source is provided in any one of the file management sub-system and the plurality of client computers.

A tenth aspect is the file management sub-system according to the fifth aspect, wherein the microprocessor executes, among a plurality of file migrations directed by the direction source, file migration other than the file migration suspended in accordance with the request information, and then notifies the direction source that there is file migration that has been suspended in accordance with the request information.

An eleventh aspect is the file management sub-system according to the first aspect, wherein the plurality of storage devices include any of a plurality of storage devices from among a storage device with a relatively slow data input/output speed, a storage device with a relatively fast data input/output speed, a storage device which shifts to a mode in which power consumption is minimized in a case where the storage device is not used for a fixed period, and a storage device which prohibits all updates after an initial write process.

In a twelfth aspect, the file management sub-system further comprises: a display device controlled by the microprocessor, wherein the microprocessor creates a settings screen for setting each of the client computers to which the migration information is to be sent, and displays the settings screen on the display device.

A file migration control method according to a thirteenth aspect is a file migration control method for changing real file systems in which files are stored in a hierarchical file system obtained by hierarchizing respective real file systems of a plurality of storage devices and a single virtual file system unifying the real file systems, the method comprising: receiving a first direction from a direction source directing execution of file migration; sending migration information, including information relating to the file migration, to all or at least one of the plurality of client computers on the basis of the first direction; receiving response information from each of the client computers which have received the migration information; suspending the file migration in a case where the response information requests suspension of the file migration; and, postponing, in a case where the response information requests postponement of the file migration, the file migration until notification to cancel the postponement is made from the client computer which sends the response information.

Advantageous Effects of Invention

At least part of the configuration of the present invention can be configured as a computer program. This computer program can be distributed by being secured on a recording medium, or may be distributed via a communication network. Furthermore, combinations other than combinations of the above aspects are also included in the scope of the present invention.

BRIEF DESCRIPTION OF DRAWINGS

FIG. 9 shows a table for managing a hierarchical file system.

FIG. 10 shows a table for managing files.

FIG. 11 shows a table for managing client computers.

FIG. 12 shows a table for managing file migration.

FIG. 13 shows a table for managing migration target files.

FIG. 14 shows a message directing migration execution.

FIG. 15 shows a message for pre-notifying migration execution.

FIG. 16 shows a response message to a migration message.

DESCRIPTION OF EMBODIMENTS

Figure 1:
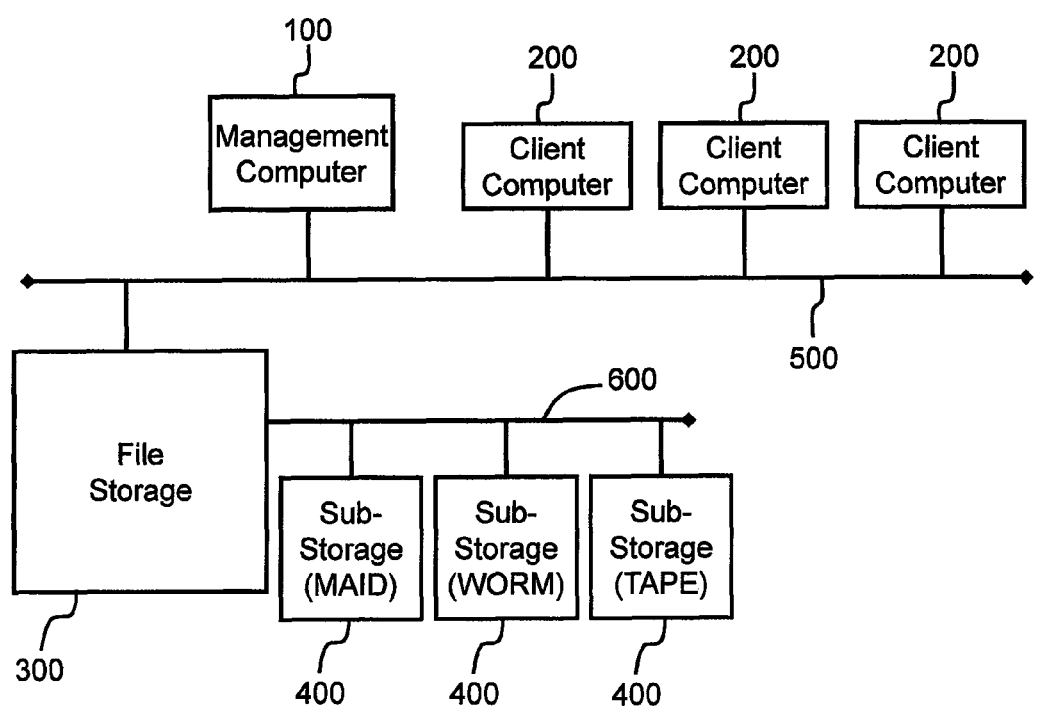
FIG. 1 shows a whole computer system including file storage.

An embodiment of the present invention will be described hereinbelow on the basis of the drawings. An overview will first be provided, followed by a detailed description. A file storage apparatus 300 includes a hierarchical file system spanning sub-storage apparatuses 400 with different access characteristics.

In a case where files are moved between the sub-storage apparatuses 400, the file storage apparatus 300 issues notification of the migration target files and the migration start time, and so forth to at least one of the client computers 200 sharing the files.

More precisely, the file storage apparatus 300 issues notification of information relating to file migration to the other computers, excluding the direction source that issued the file migration direction, prior to the start of the file migration. More precisely, the file storage apparatus 300 pre-issues notification of file migration-related information to the computers 200 that are to execute processing relating to the migration target files, among other computers 200 excluding the direction source.

The management computer 100, the client computers 200, and the file storage apparatus 300 may be mentioned as possible [migration] direction sources. For example, the management computer 100 is able to direct the file storage apparatus 300 to perform file migration in accordance with a preset migration scheme or a direction from the user. Furthermore, the client computers 200 are also capable of directing the file storage apparatus 300 to perform file migration in accordance with a direction issued by an application program running on the client computers 200, for example. Moreover, the file storage apparatus 300 is able to start up a program for executing file migration on the basis of a preset migration scheme.

at least one of the client computers 200 knows that file migration is to be performed due to notification from the file storage apparatus 300. The at least one of the client computers 200 judge the existence of pre-processing, which is to be completed before file migration is performed, and judge whether or not it is necessary to request suspension or postponement of file migration.

In a case where pre-processing is to be executed, the at least one of the client computers 200 perform the pre-processing before file migration is started. In a case where it is judged that file migration must be suspended or postponed, the at least one of the client computers 200 each issue a request to the file storage apparatus 300 to stop or postpone the file migration.

Accordingly, at least one of the client computers 200 sharing a file are able to detect migration of the file in advance. Hence, the at least one of the client computers 200 are capable of executing the required pre-processing before file migration, and of issuing a request to the file storage apparatus 300 to postpone or stop the file migration. As a result, the at least one of the client computers 200 are capable of avoiding adverse effects resulting from file migration. Adverse effects due to file migration include an unintended drop in the response time or unintended denial of update processing, for example.

In this embodiment, in order to notify associated client computers 200 before the start of file migration, the period for performing related processing, which is performed by each of the client computers 200, can be set close to the period of the file migration.

In other words, the related processing by each of the client computers 200 can be executed immediately before file migration, and the execution of related processing can be synchronized with the execution of file migration.

Hence, in a case where a content file group is moved, for example, processing to update content files can be executed between the index file creating and the content file group migration. In such case, the index file must be created again after the migration. If the storage device of the migration destination is slow, the index file creation time prolonged largely.

In contrast, in a case where the movement of the content file group is not synchronized with the creation of the index file, the content file group is sometimes moved after the index file is created. In this case, the index file just created will likely be wasted. An embodiment of the present invention will be described in detail hereinbelow. In the description below, all of the client computers except for the certain client computer sending a migration direction (if existed), receive the notification of the file migration, but the at least one of the client computer may configured not to receive the notification of the file migration, not to execute the pre-processing, or/and not to send the complete message. If the file server apparatus itself decides file migration, the client computer sending migration direction may be omitted.

Example 1

This embodiment will be described with reference to FIGS. 1 to 22. FIG. 1 is a block diagram showing the overall configuration of the computer system of this embodiment.

The computer system comprises one or more file storage apparatuses 300, one or more client computers 200, one or more management computers 100, one or more sub-storage apparatuses 400 (may also be called "lower-level storage apparatuses" hereinbelow), a frontend network 500, and a backend network 600.

The file storage apparatus 300, which serves as the "file management sub-system", is a file level storage device in which data used by the client computers 200 is stored in file-by-file. Note that the term "file" refers here to a logical unit for storing any data on a computer. Details on the hardware of the file storage apparatus 300 will be provided subsequently using FIG. 2.

The sub-storage apparatuses 400, which serve as the "plurality of storage devices", each form a lower level of the hierarchical file system. The file storage apparatuses 300 use real file systems of each of the sub-storage apparatuses 400 as a file-storage level, which is disposed on the lower level of the hierarchical file system.

The client computers 200 store parts of files, which are stored in the file storage apparatuses 300, in the sub-storage apparatuses 400. Examples of sub-storage apparatuses 400 include a storage device that employs a hard disk, a storage device that uses a tape device, and a storage device that uses a flash memory device. Furthermore, according to the intended usage, the sub-storage apparatuses 400 may include various storage devices such as a MAID, a WORM device, a backup device, or normal NAS, for example. Preferably, The sub-storage apparatus 400 receives read and/or write request designating a file or contents, and the file (or the contents) of the sub-storage apparatus 400 corresponds to the file of the file storage apparatus 300, in one-by-one or multiple-by-one. Because, the sub-storage apparatus 400 have a function like the MAID, WORM, or archive, so it is preferable that the sub-storage apparatus 400 has an own file system program (ex., real file system processing module 1410), which is different to the file system program (ex., real file system processing module 1351) of the file storage apparatus 300.

The sub-storage apparatuses 400 each include a file access processing system or storage device 323 that differs from that of the file storage apparatus 300, and have a different access characteristic (input/output characteristic) from the file storage apparatus 300. One example of the input is a read, and one example of the output is a write. A device that has substantially the same configuration as the file storage apparatus 300 can also be used as the sub-storage apparatus 400. The sub-storage apparatus 400 will be described further subsequently. Also, example of the access are the read and/or the write.

The client computer 200 is a computer such as a general-purpose server, a mainframe, a personal computer, or a portable information terminal (including a cell phone), for example. The client computer 200 includes, for example, information-inputting devices (not shown) such as a keyboard switch, a pointing device, and a microphone, and information output devices (not shown) such as a monitor display and a speaker. The client computers 200 each execute predetermined processing with respect to files on a single file system supplied by the file storage apparatus 300.

The management computer 100 manages file migration and so forth of the computer system. The management computer 100 is configured, like the client computer 200, as a computer such as a personal computer, a general-purpose server, or a mainframe for example.

The file storage apparatus 300, each of the client computers 200, and the management computer 100 are coupled to the frontend network 500. Suitable examples of communication media of the frontend network 500 include an Ethernet (registered trademark) or/and Fibre Channel.

As a communication protocol used by the frontend network 500, Transmission Control Protocol/Internet Protocol (TCP), User Datagram Protocol/Internet Protocol (UDP), or the like, can be used. In addition, higher-level protocols that can be used include Network File Storage (NFS), Common Internet File System (CIFS), Hyper Transport Transfer Protocol (HTTP), and iSCSI, and so forth.

The file storage apparatus 300 receives a file data access request from the client computer 200 via the front-end network 500. The file storage apparatus 300 sends the result of processing the access request to the client computer 200 via the front-end network 500.

The file storage apparatus 300 is capable of receiving a management access request from the management computer 100 via the front-end network 500, and of sending the processing result to the management computer 100.

Note that the configuration may be such that the front-end network 500 is divided into a data input/output communication network and a management communication network. In this case, the management computer 100, each of the client computers 200, and the file storage apparatus 300 are each coupled to the data input/output communication network and the management communication network.

The file storage apparatus 300 and each of the sub-storage apparatuses 400 are coupled to the backend network 600. The sub-storage apparatuses 400 are each capable of receiving a file data access request from the file storage apparatus 300 via the backend network 600, and of sending the processing result to the file storage apparatus 300.

The backend network 600 can be configured in the same way as the front-end network 500. A detailed description will therefore be omitted. In this example, a case in which the front-end network 500 and the backend network 600 are provided separately is shown, but the configuration is not limited to such a case, and may be such that the devices 100, 200, 300, and 400 are each coupled to a common network.

Note that, although the sub-storage apparatuses 400 and the file storage apparatus 300 are configured as separate, physically distinct devices in the drawings, this is only for illustrative purposes. For example, the file storage apparatus 300 and one or a plurality of sub-storage apparatuses 400 can co-exist within the same device. For example, the file storage apparatus 300 and the one or plurality of sub-storage apparatuses 400 can be constructed virtually on a virtual operating system ("OS" hereinbelow). The virtual file storage apparatus 300 and each of the sub-storage apparatuses 400 are capable of managing the files by using a common storage device.

Figure 2:
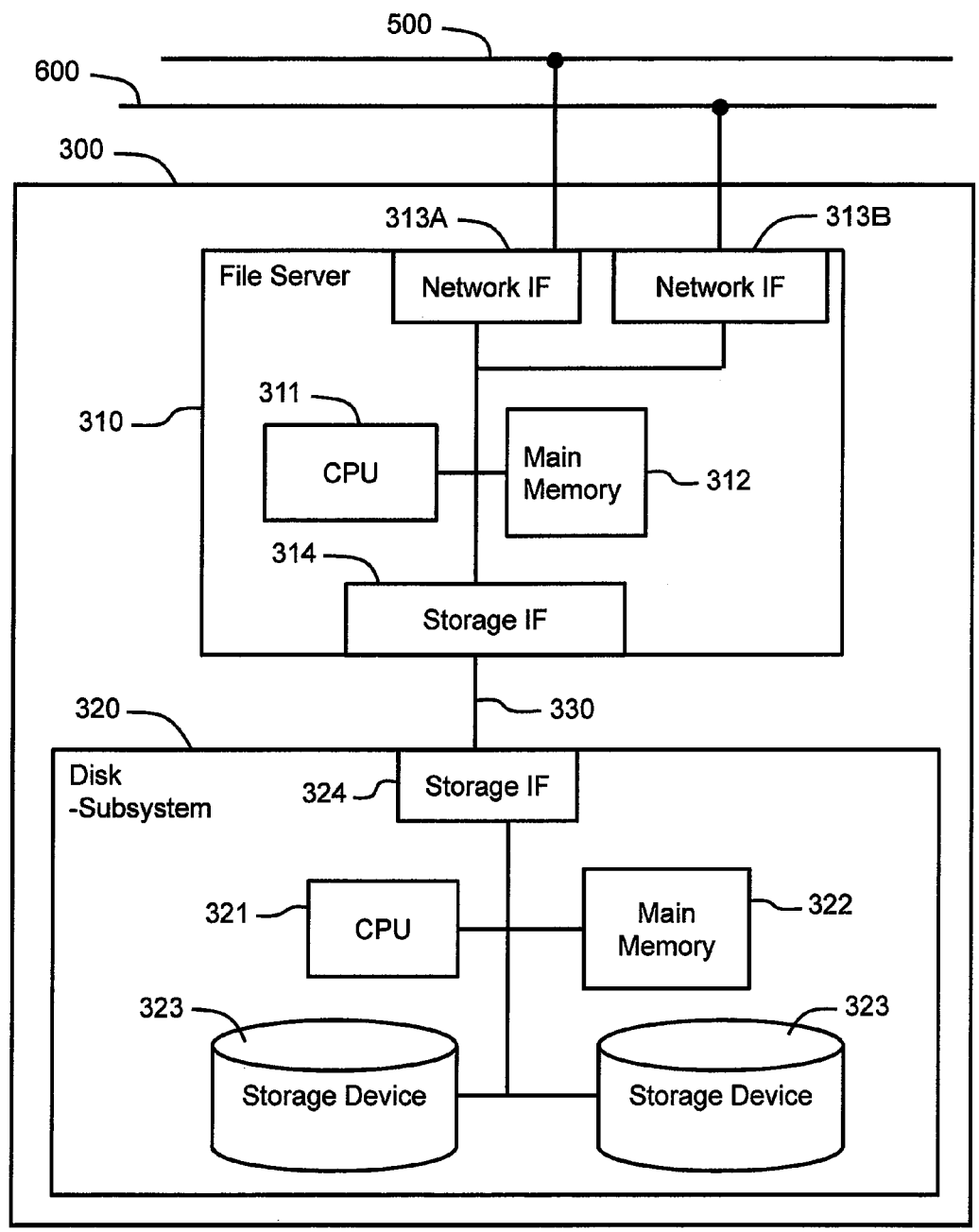
FIG. 2 shows a hardware configuration of the file storage.

A hardware configuration of the file storage apparatus 300 and the sub-storage apparatuses 400 will now be described using FIGS. 2 and 3. FIG. 2 is a block diagram showing a hardware configuration of the file storage apparatus 300.

The file storage apparatus 300 comprises, for example, a file server 310, a disk subsystem 320, and a storage network 330 for coupling together these two devices 310 and 320.

The file server 310 is a computer that includes a Central Processing Unit (CPU) 311 and a main memory 312, and so forth. The file server 310 further comprises a network interface 313A for coupling to the front network 500, a network interface 313B for coupling to the backend network 600, and a storage interface 314 for coupling to the disk subsystem.

Note that interface is abbreviated as "IF" in the drawings. Moreover, the configuration may also be such that a single interface is used for two or more applications from among the plurality of applications mentioned earlier. For example, a certain single interface may be used as the network interface 313A and the network interface 313B.

Note that the file storage apparatus 300 may also be configured to include two or more file servers 310. In this case, a cluster can be configured by a plurality of file servers 310. This embodiment can also be applied to a case in which there is a single file server 310, or to a case in which a plurality of file servers 310 form a cluster.

The CPU 311 is a processor for executing various programs that are stored in the main memory 312. The main memory 312 is a storage device for storing various programs described subsequently. The main memory 312 is configured as a volatile memory, for example.

The network interface 313A includes a network interface card such as an Ethernet (registered trademark) interface card or a wireless Local Area Network (LAN) interface card, which is capable of handling various communication speeds (10 Gbps or 1 Gpbs, for example). The network interface 313A functions as a data input/output adapter for coupling the file server 310 to the client computer 200 and to the management computer 100. The other network interface 313B also includes a hardware configuration that is the same as that of the first of the network interfaces 313A. The other network interface 313B functions as a data input/output adapter for coupling the file server 310 to the sub-storage apparatuses 400.

The storage interface 314 is configured, for example, as a Small Computer System Interface (SCSI) interface card or a Fibre Channel interface card, or as an Institute of Electrical Electronics Engineers (IEEE) interface card. The storage interface 314 functions as a data input/output adapter for coupling the file server 310 to the disk subsystem 320.

The disk subsystem 320 includes, for example, a CPU 321, a main memory 322, one or more storage devices 323, and a storage interface 324.

The CPU 321, the main memory 322, and the storage IF 324 are as described for the file server 310. The main memory 322 stores various programs, and the CPU 321 reads and executes the programs. The storage interface 324 couples the disk subsystem 320 to the file server 310.

The storage device 323 is configured as an involatile storage device. The storage device 323 comprises, for example, a hard disk drive or a Solid State Drive (SSD), or the like. The storage device 323 is used as a device for storing data at a block level. The term "block level" refers here to a logical unit for storing data of a fixed length on a computer.

The file server 310 and the disk subsystem 320 are coupled together via the network 330. The network 330 is configured as a Storage Area Network (SAN), for example. The file server 310 and the disk subsystem 320 may also be coupled together directly.

The file server 310 sends a block data access request to the disk subsystem 320 via the network 330. The file server 310 receives a result of processing the block data access request from the disk subsystem 320 via the network 330.

Note that, in this example, a case in which the file server 310 and the disk subsystem 320 are configured as physically separate devices is shown, but this is for illustrative purposes only. For example, the file storage apparatus 300 may also comprise a file server 310 with a built-in storage device 323.

Figure 3:
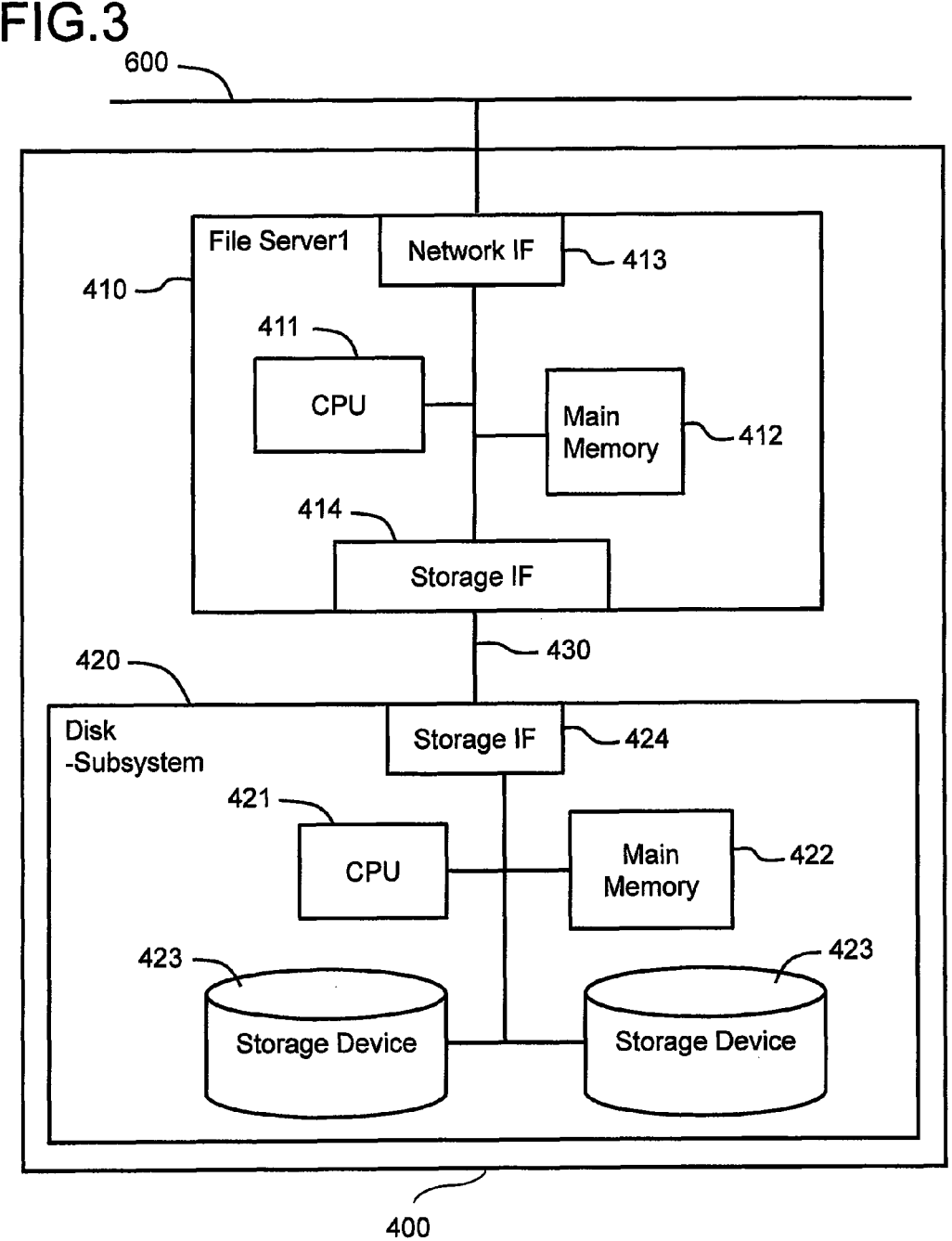
FIG. 3 shows a hardware configuration of sub-storage.

FIG. 3 is a block diagram showing a hardware configuration of the sub-storage apparatus 400. The sub-storage apparatus 400 comprises, for example, a file server 410, a disk subsystem 420, and a storage network 430 for coupling together these two devices 410 and 420.

The file server 410 is a computer that includes a Central Processing Unit (CPU) 411, and a main memory 442, and so forth. In addition, the file server 410 includes a network interface 413 for coupling to the backend network 600, and a storage interface 414 for coupling to the disk subsystem 420. These devices 411 to 414 are configured in the same way as the devices 311 to 314 of the file server 310, and are therefore not described here.

The disk subsystem 420 comprises a CPU 421, a main memory 422, one or more storage devices 423, and a storage interface 424. The CPU 421, the main memory 422, and the storage interface 424 are similar to the devices 321, 322, and 324 of the disk subsystem 320 of the file storage apparatus 300, and are therefore not described here.

The storage device 423 is an involatile storage device. The storage device 423 comprises, for example, a hard disk drive, a tape device, or HDD (MAID) with a dormancy function, or the like, and is used as a device for storing data at the block level. "Block level" refers to a logical unit for storing data of a fixed length on a computer.

Note that, in this Example, a case in which the file server 410 and the disk subsystem 420 are configured by two different physical devices is shown, but this is for illustrative purposes only. For example, the file storage apparatus 400 may also comprise only the file server 410 with the built-in storage device 423.

Figure 4:
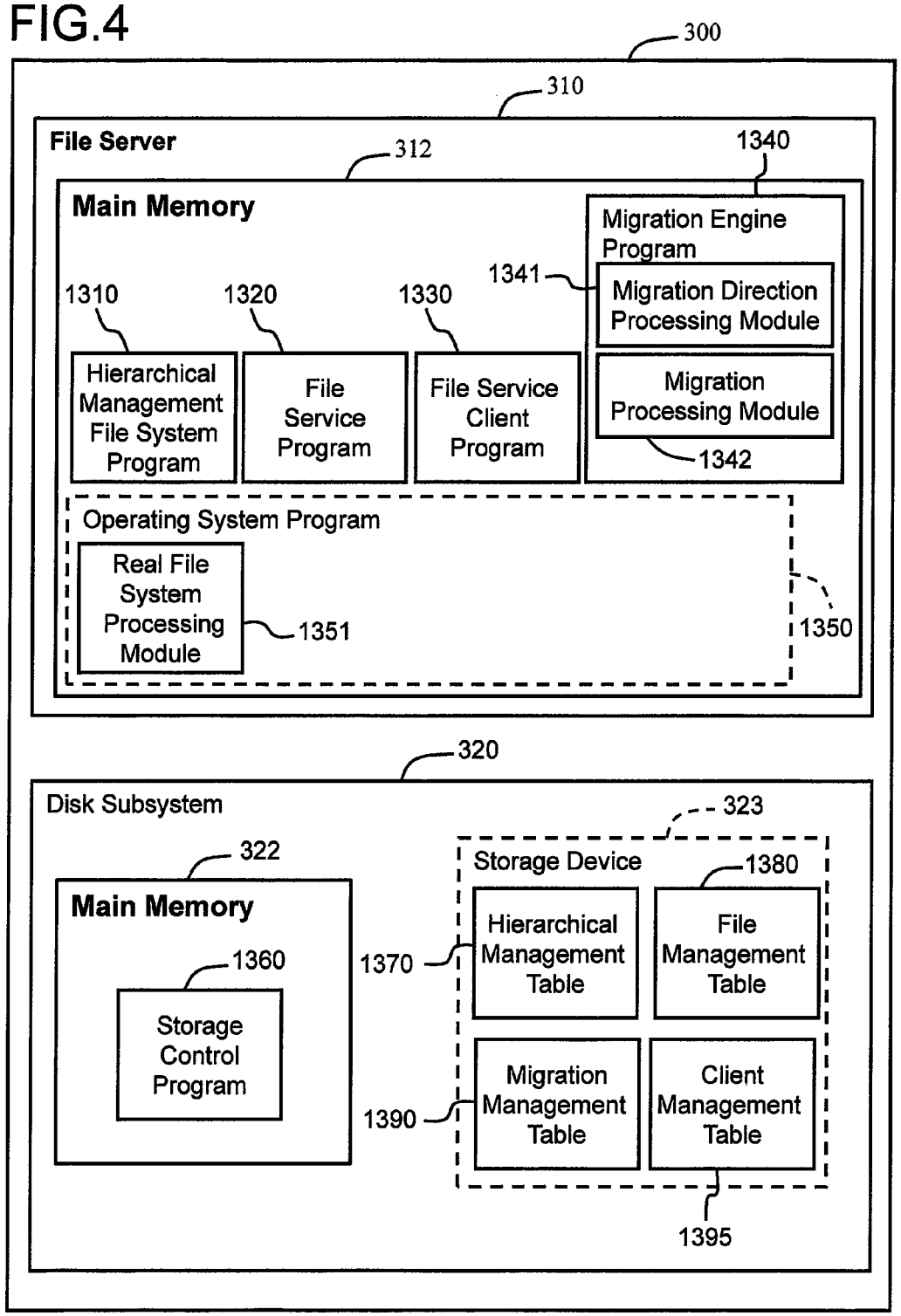
FIG. 4 shows a software configuration of the file storage.

A software configuration of the computer system will now be described with reference to FIGS. 4 to 7. FIG. 4 is a block diagram showing a software configuration of the file storage apparatus 300. A software configuration of the file server 310 will be described first, followed by a software configuration of the disk subsystem 320.

The file server 310 comprises, for example, an operating system 1350, a hierarchical management file system program 1310, a file service program 1320, a file service client program 1330, and a migration engine program 1340.

The operating system 1350 performs an input/output function, disk management, and memory management, and so forth, and provides basic functions for shared usage by higher-level programs than the operating system 1350, for example. The operating system 1350 includes a real file system module 1351.

The real file system module 1351 configures a file system, and manages data stored in the storage devices 323 in file-by-file or folder-by-folder (i.e. directory). The file system provides a function for managing and accessing the data in file-by-file or folder-by-folder.

Note that the operating system 1350 need not necessarily comprise a memory protection function or a process management function, which a typical operating system has. The operating system 1350 may also be a program that has the same functions as the real file system module 1351.

The hierarchical management file system program 1310 unifies and manages real file systems of each of the plurality of sub-storage apparatuses 400, and forms a single virtual file system, as will be described subsequently. The hierarchical management file system program 1310 discloses the single virtual file system to each of the client computers 200, which are higher-level devices.

The hierarchical management file system program 1310 interprets file data access requests that are issued by the client computers 200, converts the file data access requests into file access requests for real file systems, and performs file access with respect to the real file systems.

The hierarchical management file system program 1310 responds to the client computers 200 by sending a result of file-access processing with respect to the real file systems. File access requests from each client computer 200 are thus processed via the hierarchical management file system program 1310.

The real file systems that are included in the single virtual file system (may also be called a unified file system) may be network file systems. In a case where the hierarchical management file system program 1310 includes network file systems, the hierarchical management file system program 1310 mounts the network file systems of the sub-storage apparatuses 400 via a file service client program 1330, which will be described subsequently. The hierarchical management file system program 1310 thus reads and writes data managed by the real file systems of the sub-storage apparatuses 400.

Note that the term "network file systems" refers to file systems that are accessible via a communication network. Access to the network file systems is performed using a preset communication protocol such as NFS/C interface S, for example. Furthermore, the aforementioned mounting of file systems refers to an operation enabling access to file data through recognition of the file systems or network file systems.

In the following description, an access path in a unified file system, which is disclosed to the client computers 200 by the hierarchical management file system program 1310, will be referred to as an export path, and an access path to a file in a real file system will be called a real file path.

The file service program 1320 is a program for processing requests to access file data that is received from the client computer 200.

The file service client program 1330 is a program for performing file data access to the real file systems of the sub-storage apparatuses 400 coupled via the backend network 600.

Examples of a communication protocol compatible with the file service client program 1330 include NFS/S interface S/HTTP. The file service client program 1330 network-mounts the real file systems of the sub-storage apparatuses 400, and provides access via real file paths to a higher-level program such as the hierarchical management file system program 1310.

The migration engine program 1340 is a program for executing file migration on the basis of a migration direction message (described subsequently in FIG. 14). A migration direction message 2000 can be issued by the management computer 100 or the client computers 200, for example, as will be described subsequently. Furthermore, the migration direction message 2000 can be generated in the file storage apparatus 300 by means of a migration schedule or migration policy, which is preset in the file storage apparatus 300.

The migration direction message 2000 includes a migration-target file name, a migration destination, and information specifying whether migration should be compulsorily executed, and so forth.

Here, a migration schedule-based migration direction message 2000 refers to a migration direction message that is issued in specific time zones at regular intervals or issued repeatedly.

A migration policy-based migration direction message 2000 refers to a migration direction message that is issued by the hierarchical file system in a case where a specific preset condition is satisfied. For example, the migration direction message 2000 is issued in a case where the storage capacity of a storage device exceeds a threshold value. The migration direction message 2000 is issued even for a file of low usage frequency such as a file that has not been updated for a fixed period since the last update date and time, for example.

The migration engine program 1340 contains, for example, a migration direction processing module 1341 for processing the migration direction message 2000, and a migration processing module 1342 for performing migration.

A software configuration of the disk subsystem 320 will now be described. The main memory 322 stores a storage control program 1360. The storage control program 1360 is a program which accesses the storage device 323 on the basis of a block data access request received from the file server 310 via the storage interface 324, and which sends back a response to the file server 310.

The storage device 323 of the disk subsystem 320 includes a hierarchical management table 1370, a file management table 1380, a migration management table 1390, and a client management table 1395. Note that each of the management tables 1370, 1380, 1390, and 1395 may also be stored in the main memory 312 of the file server 310. and main memory 312 may be other type of the memory (semi-conductor memory, HDD, or like).

The hierarchical management table 1370 stores information on each of the sub-storage apparatuses 400 which include the real file systems forming the unified file system, and information relating to the device type of the sub-storage apparatuses 400, and so on. Details on the hierarchical management table 1370 are provided subsequently in FIG. 9. The file management table 1380 stores an association between the export path and the real file path for each file. Details on the file management table 1380 will be provided subsequently in FIG. 10.

The client management table 1395 stores information relating to the client computers 200 to which a migration message 2100, described subsequently, is to be relayed. Details on the client management table 1395 will be provided subsequently in FIG. 11.

The migration management table 1390 stores a migration status for each file migrated by the migration engine program 1340. Details on the migration management table 1390 will be provided subsequently in FIG. 12.

Figure 5:
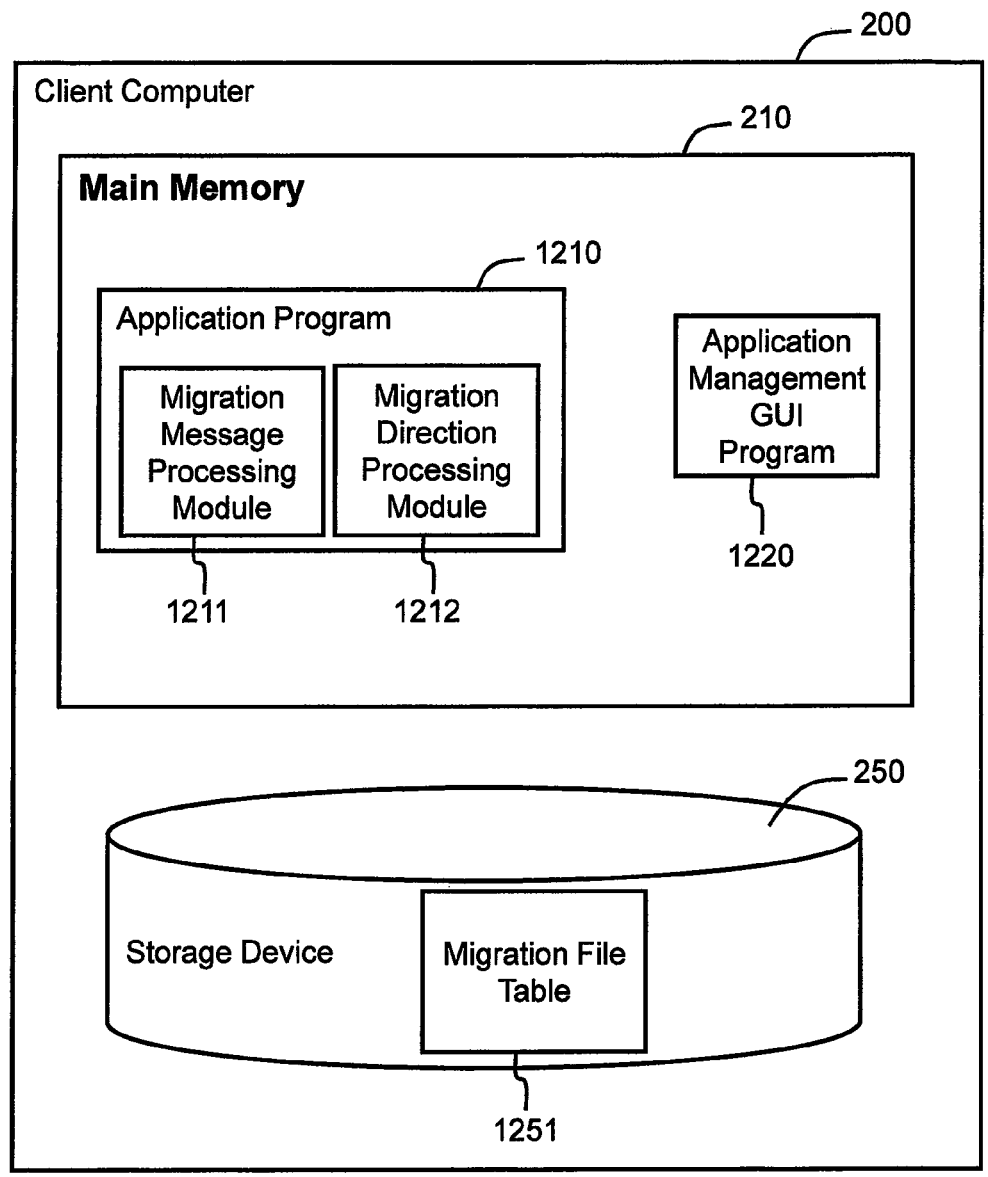
FIG. 5 shows a software configuration of a client computer.

FIG. 5 shows a software configuration of the client computer 200. The client computer 200 includes an application program 1210 and an application management GUI program 1220, for example. The programs 1210 and 1220 are each stored in the main memory 210 of the client computer 200.

The application program 1210 is a program for performing specific processing (services) using each file provided by the file server 310. Examples of services provided by the application program 1210 include provision of a full-text search, a virus check, content management, and a file access GUI, and so forth.

The application program 1210 includes a migration message processing module 1211 and a migration direction processing module 1212. The migration message processing module 1211 is a program that receives the migration message 2100 sent from the file storage apparatus 300, and which notifies the application [program] 1210. The migration message processing module 1211 receives the migration message 2100 from the file storage apparatus 300 in a case in which another client computer 200 or file storage apparatus 300 issues a direction to execute file migration.

The migration direction processing module 1212 is a program used in a case where the client computer 200 directs the file storage apparatus 300 to perform migration.

In a case where migration is performed by means of a direction from the migration direction processing module 1212, the migration message 2100 is sent in advance from the file storage apparatus 300 to the migration message processing module 1211 of the other client computers 200.

The application management GUI program 1220 provides an application administrator with a migration policy GUI for setting a migration policy relating to file migration. Details on the migration policy GUI will be provided subsequently in FIGS. 21 and 22.

A storage device 250 of the client computer 200 includes a migration file table 1251. The migration file table 1251 stores the status of migration target files. Details on the migration file table 1251 will be provided subsequently in FIG. 13.

Figure 6:
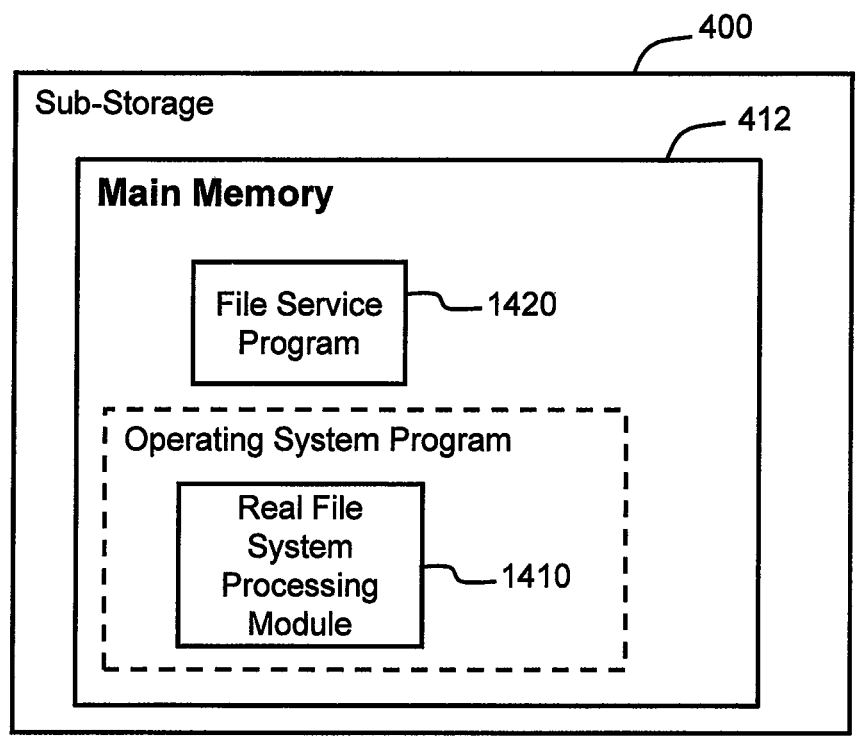
FIG. 6 shows a software configuration of the sub-storage.

FIG. 6 shows a software configuration of the sub-storage apparatus 400. The sub-storage apparatus 400 includes, for example, a real file system processing module 1410, and a file service program 1420. The programs 1410 and 1420 are each stored in the main memory 412 of the sub-storage apparatus 400.

The real file system processing module 1410 basically comprises the same functions as the real file system processing module 1351. In addition, the real file system processing module 1410 comprises functions such as a WORM function, a MAID function, and a tape co-operation function, for example, according to the respective applications of the sub-storage apparatuses 400.

The real file system processing module 1410, which includes the WORM function, denies update processing by higher-level programs once a file has been written, and ensures that the file is not falsified.

The real file system processing module 1410, which includes the MAID function, reduces power consumption during standby by placing the storage devices (hard disk drives) in a dormant state in time zones in which there is no file access.

The file system processing module 1410, which has the tape co-operation function, temporarily stores the files written from the file storage apparatus 300 to a high-speed storage device, and then stores the files in a low-speed tape device.

The file service program 1420 processes file data access requests received from the file storage apparatus 300, and sends back a response. The file system processing module 1410 and/or the file service program 1420 may be treat a file access protocol doesn't treat the folder, like a contents-ID.

Figure 7:
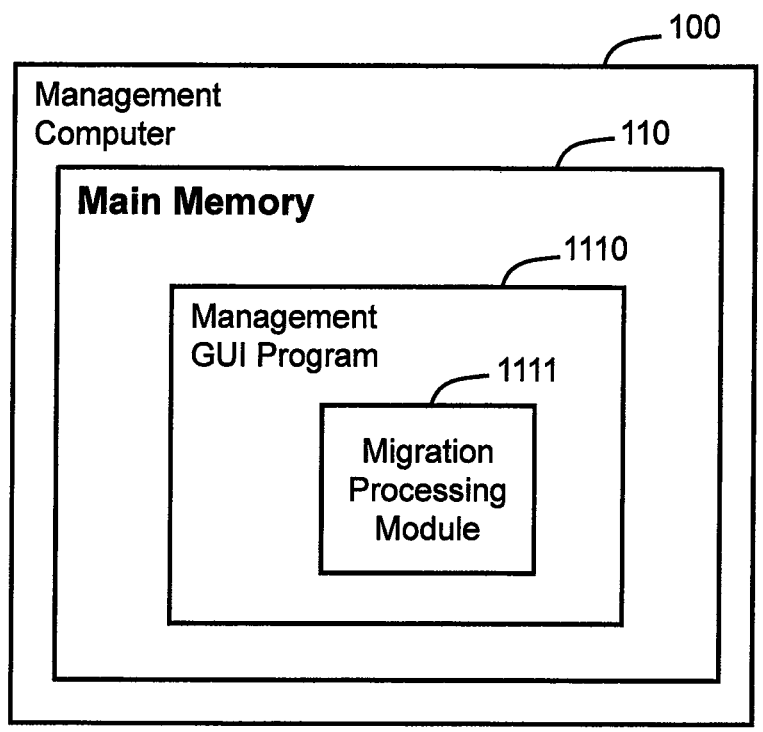
FIG. 7 shows a software configuration of a management computer.

FIG. 7 shows a software configuration of the management computer 100. The management computer 100 is configured as a computer that comprises a microprocessor (not shown) and a main memory 110. The management computer 100 comprises a management GUI program 1110. The management GUI program 1110 provides the administrator with a screen for setting client computers 200 to which a migration notification is to be sent, and a screen for setting a policy for when migration is suspended. The management GUI program 1110 notifies the file storage apparatus 300 of changes to settings made via these settings screens, and reflects these changes in the file storage apparatus 300.

The management GUI program 1110 includes a migration processing module 1111. The migration processing module 1111 is a program for notifying the file storage apparatus 300 of migration processing that is directed by the administrator via the management GUI program 1110. The migration processing module 1111 implements the same functions as the migration direction processing module 1212 mentioned earlier.

Note that the management computer 100 may include user interface devices such as a monitor display and a keyboard switch. The configuration may also be such that an operation computer terminal is coupled to the management computer 100 and migration settings and so forth are made via this computer terminal.

In the following description, processing to implement the functions of each of the programs or processing modules of the file server 310, the disk subsystem 320, the client computer 200, the sub-storage apparatus 400, and the management computer 100 is described as being executed by each of the "programs" or "processing modules". In reality, predetermined functions are implemented as a result of the CPU in each device reading and executing the "programs". Therefore, it may be express that subject of the process explained in the embodiment is the apparatus (ex. file storage apparatus 300, sub-storage apparatus 400, management computer 100, client computer 200) or the CPU.

An overview of the operation of this Example will now be described with reference to FIG. 8. In this Example, the file storage apparatus 300, which the hierarchical file system comprises, sends information (the migration message 2100) relating to migration execution to each of the other client computers 200 sharing a migration target file, before executing the migration processing. After receiving the migration message 2100, each of the client computers 200 executes, where required, pre-processing which is to be executed before migration, or issues a request to the file storage apparatus 300 to postpone or stop migration.

When the migration start time is reached, the file storage apparatus 300 implements migration, with the exception of files for which migration suspension or postponement has been requested. After receiving a completion notice from the source of the request, the file storage apparatus 300 performs sequential migration of files for which postponement had been requested. The file storage apparatus 300 excludes files for which migration suspension has been requested from the migration targets.

After file migration ends, the file storage apparatus 300 sends a completion message including information on files for which migration was suspended to the client computer 200 that issued the migration direction. After receiving the completion message, the client computer 200 judges whether the migration direction should be re-issued.

As a result of performing the above processing, an unintended drop in the access response time or file update denial due to file migration can be prevented from occurring in the client computers 200 sharing the files in the hierarchical file system.

In this example, the client computers 200, which are transmission destinations of the migration message 2100, are registered beforehand by the administrator. The configuration may instead be such that all the client computers that are able to use the migration target file are automatically detected and the migration message 2100 is sent [to these client computers], for example. The configuration may also be such that the migration message 2100 is automatically sent to all the client computers 200 within the same network.

The flow of the abovementioned series of processes will now be described with reference to FIG. 8. In FIG. 8, a case is illustrated, to facilitate understanding, in which the client computer 200, which operates as a search engine server (hereinafter abbreviated as "search engine server"), creates a migration-target file search index before file migration in accordance with a direction from the management computer 100 is executed.

The file storage apparatus 300 provides the client computer with a hierarchical file system (unified file system) which comprises three real file systems, namely, the real file system in the file storage apparatus 300 (abbreviated as "normal file system" hereinbelow), the real file system included in the sub-storage apparatus 400 with the WORM function (abbreviated as "WORM file system" hereinbelow), and the real file system included in the sub-storage apparatus 400 with the tape co-operation function (abbreviated as "tape file system" hereinbelow).

The administrator directs execution of file migration by using the management computer 100. Here, a case in which files managed by a high-speed normal file system are moved to a tape file system will be described.

First, the management computer 100 sends the migration direction message 2000 to the file storage apparatus 300 (S1). The migration direction message 2000 directs that files included in the normal file system be migrated to the tape file system.

Upon receipt of the migration direction message 2000, the file storage apparatus 300 determines the tape file system that is to be the migration destination and the time at which migration is to be started.

Thereafter, the file storage apparatus 300 creates a migration message 2100 that includes a migration target file, information specifying a migration source, the type of the migration-destination storage device, and a migration start time. The file storage apparatus 300 sends the migration message 2100 to each of the pre-registered client computers 200 (S2). The file storage apparatus 300 sends the migration message 2100 at a time that precedes the migration start time by a predetermined period.

After receiving the migration message 2100, each client computer 200 judges whether or not there is processing to be executed before file migration is started. In this Example, the search engine server determines that the migration-target file search index must be re-created before files are migrated to a tape file system with a long response time.

The search engine server therefore sends a response message 2200 to the file storage apparatus 300 (S3). The response message 2200 requests that migration of files for which the search index is to be created be postponed. After sending the response message 2200, the search engine server starts to create a search index (S4).

Once the migration start time is reached, the migration engine 1340 starts to migrate other files excluding those files for which postponement has been requested by the search engine server (S6).

When search index creation is complete, the search engine server sends a completion message to the migration engine 1340 (S5). Upon receipt of the completion message, the migration engine 1340 performs migration of files for which migration had been postponed (S6).

Finally, the file storage apparatus 300 sends a migration completion message to the management computer 100 that directed the migration (S7). The management computer 100 confirms that there are no files for which migration has been suspended on the basis of the migration completion message, and ends the processing.

Figure 8:
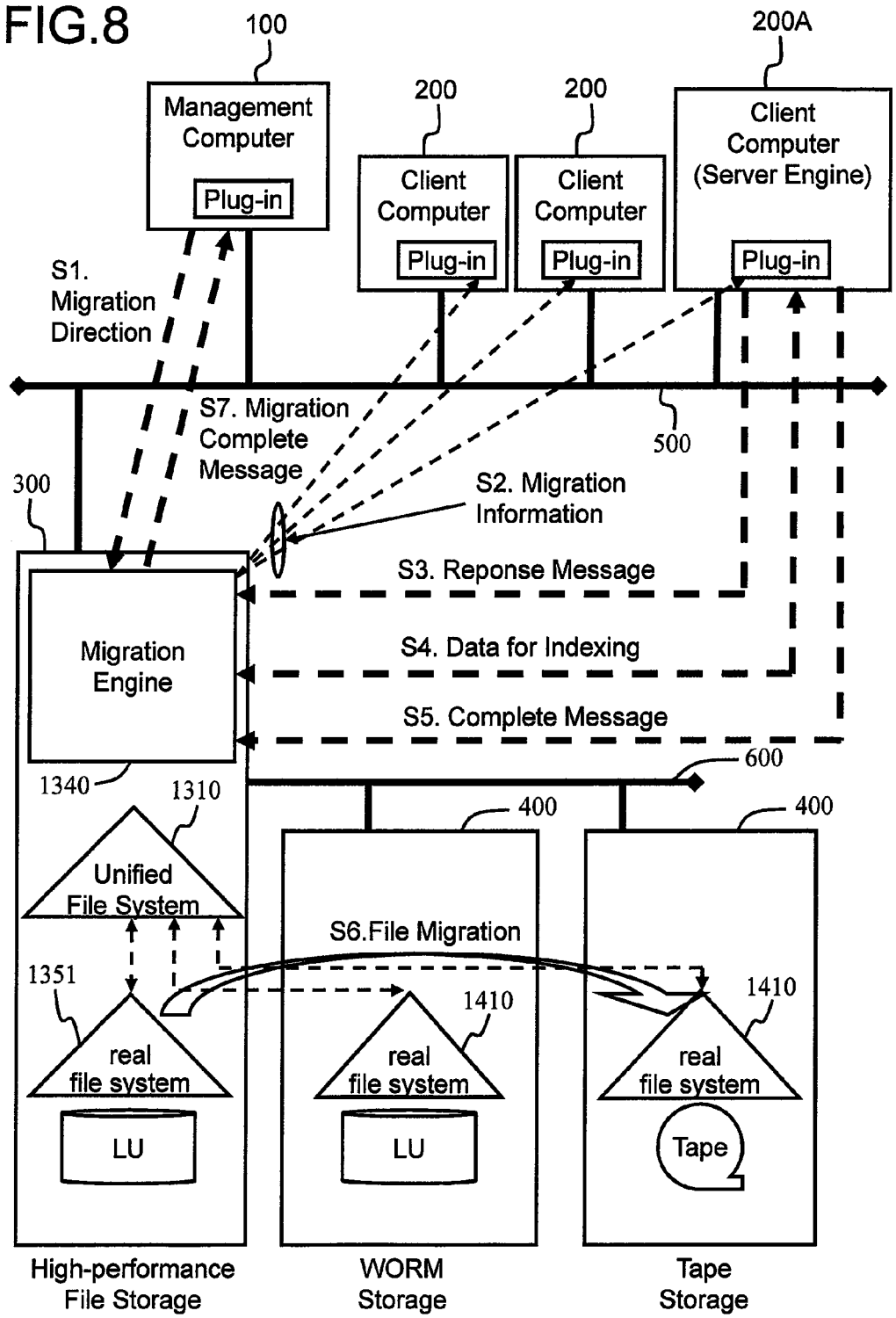
FIG. 8 is an explanatory diagram providing an overview of file migration.

Note that the description of FIG. 8 is merely an example. For example, the client computer 200 is capable of performing pre-processing such as virus scan processing or thumbnail creation processing and so forth before file migration to the tape device or MAID device is started. The client computer 200 is also capable of requesting that the migration of files updated at regular intervals, such as log files, be stopped.

Note that the information used in this Example will be described in the following description using expressions such as " table", " list", or " database", for example. However, information may also be expressed using data structures other than data structures such as a table, a list, a database (DB) or a queue, and so forth. Hence, in this Example, such information will sometimes be referred to as " table" and so forth to show that the information is independent of the data structure.

Moreover, in order to illustrate the content of each information item, expressions such as "identification information", "identifier", "ID", and "name" are sometimes used, but these expressions are interchangeable.

Furthermore, hereinafter, the description will sometimes be provided with the "program" as the subject; however, since programs perform predetermined processing using memory and a communication port by being executed by a processor, the operation may also be described with the processor as the subject of the description. Furthermore, some or all of the programs may also be implemented by dedicated hardware.

The configuration may also be such that various programs are installed on computers using a program distribution server or using storage media.

FIG. 9 shows the hierarchical management table 1370. The hierarchical management table 1370 manages, for each real file system included in the unified file system, a storage device name 1370A, a file system name 1370B, a type 1370C, and a mount path 1370D.

The hierarchical management file system program 1310 mounts a plurality of real file systems by referring to the hierarchical management table 1370 each time the system starts up, and thereby constructs the unified file system.

The storage device name 1370A stores the host names of the sub-storage apparatuses 400 in which the real file systems are stored. Here, the term "host name" signifies an identifier for identifying a specific device on the network. The file system name 1370B stores the identifier of the real file system in each of the sub-storage apparatuses 400. The type 1370C stores file system types specifying the access characteristics of the real file systems.

Examples of the type 1370C include "normal", which indicates a normal file system, "worm", which denotes a WORM file system, "tape", which denotes a tape file system, and "maid", which indicates a MAID file system, and so on. A MAID file system denotes the real file systems of the sub-storage apparatuses 400 configured as MAID devices. Note that the tape file system is characterized by its slow responsiveness during random access. The abovementioned file type 1370C is an example, and types corresponding to other access characteristics are also possible.

The mount path 1370D stores mount paths to real file systems in the file storage apparatus 300, which are used by the hierarchical management file system program 1310. The term "mount point" as used here signifies an access path used by the OS or by various programs when a mounted file system is accessed. The hierarchical management file system program 1310 enables file data access to real files by mounting real file systems in the mount paths set in the mount path 1370D, when the system starts up.

Figure 10:
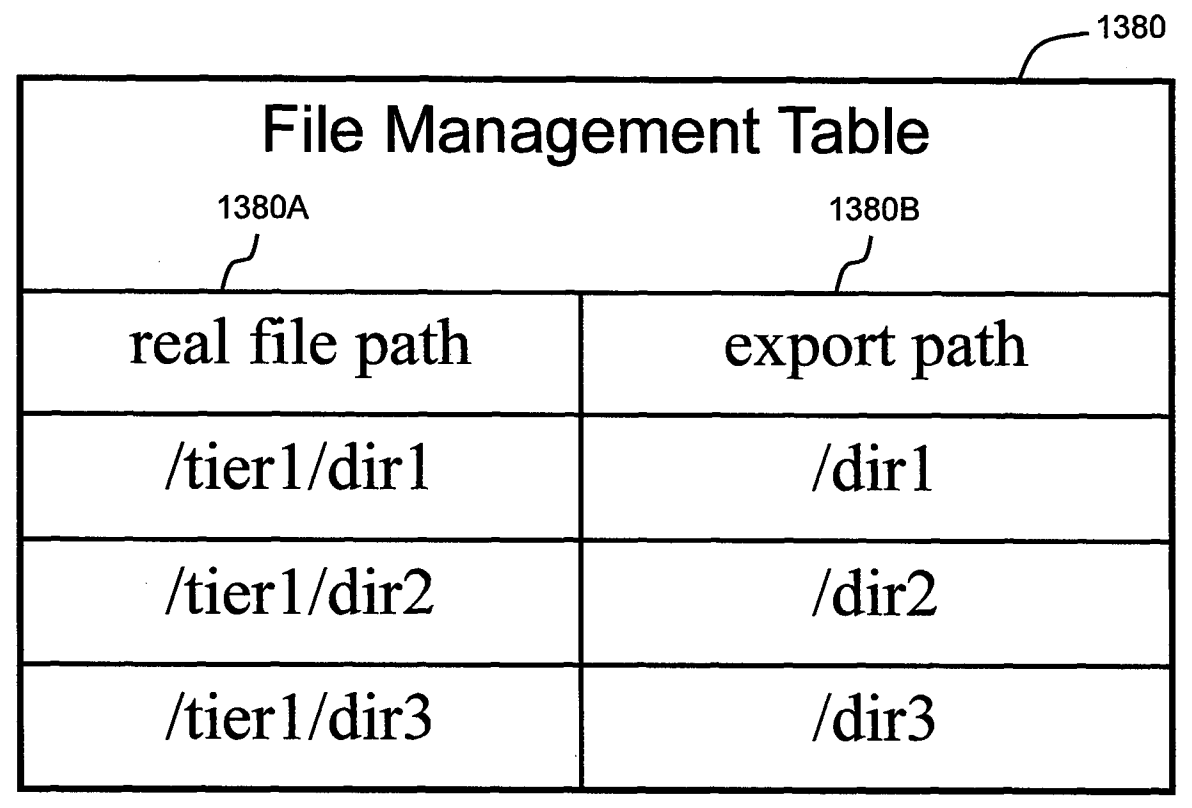

FIG. 10 shows the file management table 1380. The file management table 1380 includes a real file path 1380A for each real file or each folder managed by the hierarchical management file system program 1310, and an export path 1380B.

The real file path 1380A stores access paths of real files or folders. When a folder is designated in the real file path 1380A, settings are applied to the whole folder. Note that, as the access path, an access path below the mount path in which the real file system of another storage device is mounted may also be designated.

The export path 1380B stores an access path for a case where the client computer 200 accesses each file or folder. The export path 1380B is a path that is disclosed by the unified file system to the client computer 200. In a case where a file data access request designating the export path 1380B is received from the client computer 200, the hierarchical management file system program 1310 converts the export path into a real file path, accesses the real file, and sends the processing result to the client computer 200 by way of response.

FIG. 11 shows the client management table 1395. The client management table 1395 includes an export path 1395A and a client computer name 1395B.

The migration engine program 1340 is capable of determining the client computers 200 to which the migration message 2100 is to be sent before migration is executed on the basis of the information managed by the client management table 1395.

An export path 1390A stores export paths of the files or folders serving as the migration targets. The client computer name 1395B stores the host names of the client computers 200 which are to be transmission targets of the migration message 2100. The client computer name 1395B allows a plurality of client computers 200 to be designated.

FIG. 12 is an explanatory diagram showing a migration management table 1390. The migration management table 1390 includes the export path 1390A, an ID 1390B, a client computer name 1390C, a migration source 1390D, a migration destination 1390E, a status 1390F, and a scheduled start time 1390G. The migration program 1340 controls migration processing by referring to the migration management table 1390.

The export path 1390A stores export paths of the migration target files and folders. The ID 1390B stores identifiers for uniquely identifying migration processing. The client computer name 1390C stores the host names of the client computers 200 that issued the migration directions. The migration source 1390D stores the real file paths serving as the migration sources. The migration destination 1390E stores the real file path of the migration destinations of the migration target files. The migration source 1390D and the migration destination 1390E may be identifies the file instead of the path.

The status 1390F stores the status of the migration processing. Examples of migration processing statuses that are stored include "not ready", which indicates that preparations for migration are underway, "ready", which indicates that migration preparations are complete, "processing", which indicates that migration is in progress, "finished", which indicates that migration has ended, "wait", which indicates that migration has been postponed, and "cancel", which indicates that migration has been suspended. The start time 1390G stores a scheduled start time for migration.

FIG. 13 shows the migration file table 1251. The migration file table 1251 includes, for each migration-target file or folder, an export path 1251A, a status 1251B, and a retry count 1251C.

The export path 1251A stores export paths of the migration target files or folders. The status 1251B shows the migration statuses of the files or folders. Examples of migration statuses include "Processing", which indicates a state where migration has been directed, and "Retrying", which indicates that migration is being executed for a file or folder for which migration has been temporarily suspended.

FIG. 14 is an explanatory diagram showing the migration direction message 2000, which is the "first direction". The migration direction message 2000 includes, for example, for each migration target file or folder, an export path 2000A, a migration destination 2000B, and a force bit 2000C. In the following description, the term "file" also encompasses folder.

Note that the client computer(s) 200 and the management computer 100 are capable of simultaneously directing migration of a plurality of files by including the plurality of files in a single migration direction message 2000.

The export path 2000A stores export paths of migration target files. The migration destination 2000B stores the types of migration-destination sub-storage apparatuses 400. Types stored in the migration destination 2000B that may be mentioned include "worm", which indicates a WORM device, "tape", which denotes a tape device, and "maid", which indicates a MAID device. Note that these types are for illustrative purposes only.

The present Example illustrates an example in which, as a method for designating the migration destination, the type of the migration-destination storage device alone is designated. However, a configuration in which the migration-destination sub-storage apparatus name or real file system name is designated directly may instead be used.

The force bit 2000C, which is the "forced execution information", stores control information indicating whether or not migration is to be compulsorily performed. In a case where the force bit is set to "0", the migration engine program 1340 postpones or stops migration in response to a postponement request or suspension request from the client computer 200. In contrast, in a case where the force bit is set to "1", the migration engine program 1340 compulsorily executes migration even when a postponement request or suspension request is received from the client computer 200.

FIG. 15 shows the migration message 2100, which is the "migration information". The migration message 2100 includes, for each migration target file, an export path 2100A, an ID 2100B, a migration source type 2100C a migration destination type 2100D, a start time 2100E, and a force bit 2100F.

The file storage apparatus 300 creates the migration message 2100 shown in FIG. 15, and sends the migration message 2100, before the directed migration is performed, to each of the client computers 200 registered in the client management table 1395.

The export path 2100A stores export paths of migration target files. The ID 2100B stores identifiers for uniquely identifying migration processing. The migration source type 2100C stores the types of the real file systems serving as the migration sources. The migration destination type 2100D stores the type of the real file systems serving as the migration destinations. The start time 2100E stores times scheduled for the start of migration. The force bit 2100 stores information indicating whether or not migration is to be executed compulsorily, similarly to the force bit 2000C illustrated in FIG. 14.

FIG. 16 shows the response message 2200, which is the "response information". The response message 2200 includes, for each migration target file, an export path 2200A, an ID 2200B, and a request 2200C which serves as the "request information". In a case where postponement or suspension of migration is requested, the client computer 200 creates a response message 2200 and sends the response message 2200 to the file storage apparatus 300.

The export path 2200A stores export paths of the migration target files. Lower-level folders or files, which are included in the export path 2100A of the migration message 2100, may also be designated in the export path 2200A. In other words, the client computer 200 is configured to be capable of requesting suspension or postponement of all or some of the migration target files notified in the migration message 2100. The ID 2200B stores identifiers for uniquely identifying migration processing. The request 2200C stores requests for directing postponement or suspension of migration of the migration target files. The request 2200C stores "wait" in cases where migration postponement is requested, and "cancel" in cases where migration suspension is requested.

Figure 17:
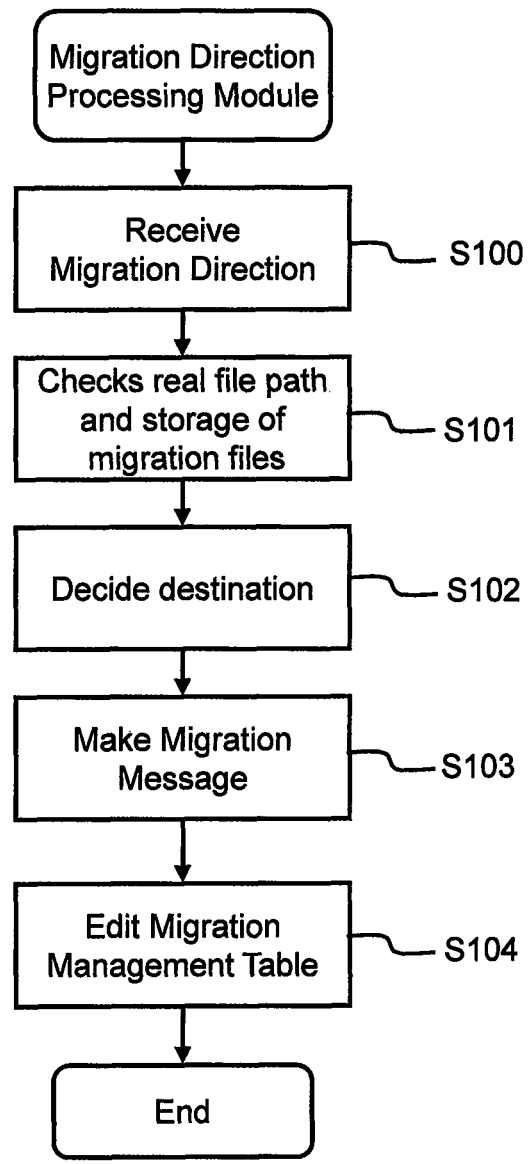
FIG. 17 is a flowchart showing processing in which the file storage plans file migration.

FIG. 17 is a flowchart showing processing in a case where the migration direction processing module 1341 receives the migration direction message 2000.

The migration direction processing module 1341 processes the received migration direction in a case where the migration direction message 2000 is received from the client computer 200 or the management computer 100 (S100). Note that, in cases where the administrator has preset a migration schedule or a migration policy via the management computer 100, the migration direction processing module 1341 takes the migration direction message 2000, issued on the basis of the migration schedule or the migration policy, as the processing target.

The migration direction processing module 1341 checks the correspondence relation between the export path 2000A described in the migration direction message 2000, and the export path 1390A and the real file path 1390B in the file management table 1380 (S101). The migration direction processing module 1341 thus specifies the real file path of the migration target file.

Thereafter, the migration direction processing module 1341 checks the migration target real file paths against the hierarchical management table 1370, and specifies the storage name 1370A and type 1370C of the sub-storage apparatuses 400 storing the migration target files.

The migration direction processing module 1341 subsequently decides on a real file system matching the condition (type) designated as the migration destination, on the basis of the migration destination 2000B in the migration direction message 2000 and the hierarchical management table 1370 (S102). The migration direction processing module 1341 creates a suitable folder under the real file system thus determined. The migration target files are stored in this folder.

The migration direction processing module 1341 creates an ID uniquely identifying migration processing for each of the export paths 2000A directed by the migration direction message 2000.

Thereafter, the migration direction processing module 1341 sets a time for starting the migration processing to a suitable time. The start time is selected from among time zones not affecting normal access, such as at night or on a holiday, and so forth, for example. The migration direction processing module subsequently creates a migration message 2100 which includes the export path 2000A included in the migration direction message 2000, the created ID, the type 1370C of the migration source device checked in S101, the type of the migration destination device determined in S102, and the start time (S103). Finally, the migration direction processing module 1341 registers the export path 1390A, the migration-source real file path, the migration-destination real file path, the "ready" status, and the start time, in the migration management table 1390 (S104).

Figure 18:
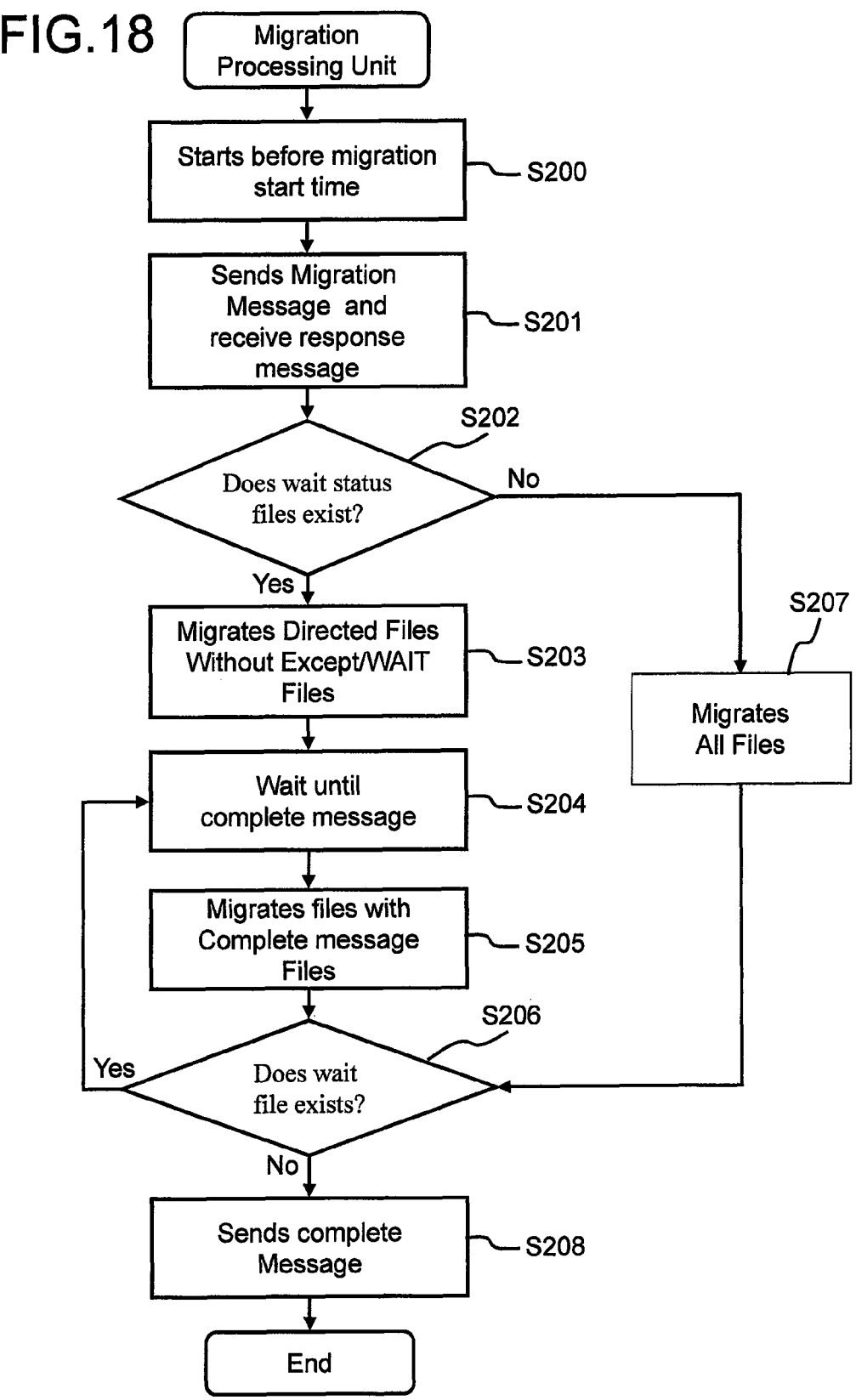
FIG. 18 is a flowchart showing file migration processing.

FIG. 18 is a flowchart showing the processing of the migration processing module 1342 during migration processing.

The migration processing module 1342 starts up upon receipt of a command from the operating system 1350 or a command from the migration engine program 1340 a predetermined period before (for example, thirty minutes before) the start time 1390G registered in the migration management table 1390 (S200). A period of thirty minutes before the migration start time is only an example—this period may be earlier or later than thirty minutes before. The configuration may also be such that the value of the predetermined period is preset by the administrator.

The migration processing module 1342 checks the client computers 200 serving as transmission destinations of the migration message 2100 on the basis of the export paths 1390A of the migration target files, and the client management table 1395.

The migration processing module 1342 subsequently sends the migration message 2100 to each of the transmission-destination client computers 200, and awaits the migration start time (S201).

In a case where the response message 2200 is received from the client computers 200 that received the migration message 2100, the migration processing module 1342 judges whether or not the response message 2200 includes a suspension request or a postponement request for the migration target files with a force bit 2000C set at "0" (S201).

In a case where the response message 2200 includes a suspension request or postponement request for the migration target files with a force bit set at "0", the migration processing module 1342 edits the migration management table 1390 and updates the status 1390F to "cancel" or "wait".

Once the migration start time is reached, the migration processing module 1342 checks the migration management table 1390, and checks for the existence of "wait" status migration target files (S202). In a case where there is a "wait" status migration target file (S202: YES), the migration processing module 1342 performs the processing of S203 (described subsequently). In a case where there is no "wait" status migration target file (S202: NO), the migration processing module 1342 advances to S207 (described subsequently).

The migration processing module 1342 performs migration processing for files with the status "ready" (S203). The migration processing module 1342 updates the status 1390F of the migration management table 1390 to "finished" after migration is complete.

The migration processing module 1342 waits until a completion message is returned from the client computers 200 that requested postponement (S204). In a case where a completion message is received, the migration processing module 1342 advances to S205 (described subsequently).

After receiving a completion message from the client computer 200, the migration processing module 1342 specifies the migration target files for which postponement has been canceled on the basis of the ID contained in the completion message and of the migration management table 1390. The migration processing module 1342 performs migration processing of the specified file and updates the status 1390F of the migration management table 1390 to "finished" (S205).

The migration processing module 1342 checks the migration management table 1390 and checks whether or not there is a file for which the status 1390F has been set to "wait" (S206). In a case where there is a "wait" status file (S206: YES), the migration processing module 1342 re-executes the processing of S204 and, when no such file exists (S206: NO), the migration processing module 1342 advances to S208 (described subsequently).

Furthermore, in a case where it is judged in S202 that there is no "wait" status" file (S202: NO), the migration processing module 1342 performs migration of all the migration target files and updates the status 1390F of the migration management table 1390 to "finished" (S207).

The migration processing module 1342 sends a migration completion message to the client computer 200 or the management computer 100 that issued the migration direction (S208). The migration completion message includes the paths of files for which migration processing is suspended. As a result, the migration processing module 1342 ends the migration processing.

Figure 19:
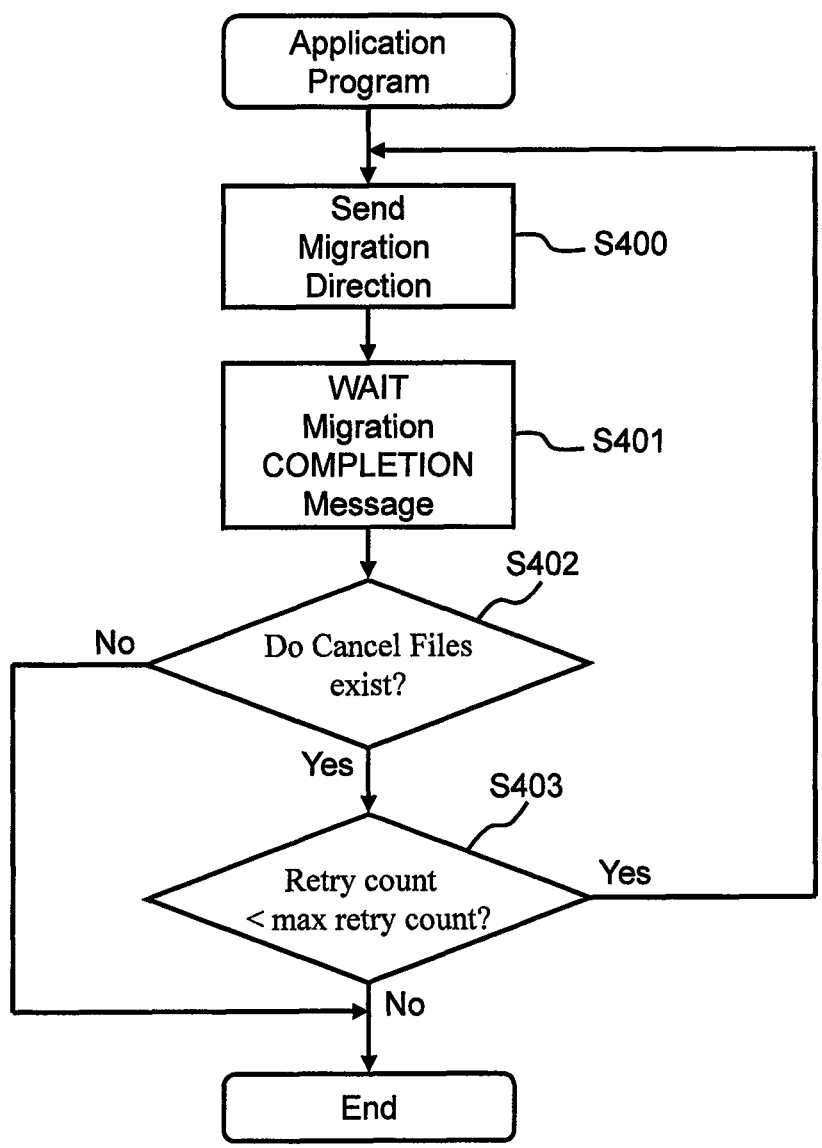
FIG. 19 is a flowchart showing processing in a case where a client computer issues a file migration direction.

FIG. 19 is a flowchart showing processing in which the application program 1210 issues a migration direction.

The application program 1210 issues a migration direction to the migration direction processing module 1212 in a case where file migration is performed. The migration direction processing module 1212 creates the migration direction message 2000 and sends the migration direction message 2000 to the file storage apparatus 300 (S400).

The application program 1210 then stores, in the migration file table 1251, information on files for which the migration has been directed. Thereupon, the status of each file is set to "Processing", and the retry count is set to zero.

The application program 1210 waits until a migration completion message is received from the file storage apparatus 300 (S401).

Upon receipt of the migration completion message from the file storage apparatus 300, the application program 1210 deletes files for which migration processing is complete from the migration file table 1251.

If a file for which migration has been suspended exists (S402: YES), the application program 1210 advances to S403 (described subsequently). In cases where a file for which migration has been suspended does not exist (S402: NO), this processing ends.

The application program confirms the retry count 1251C in the migration file table 1251, and judges whether or not the retry count exceeds a preset maximum retry count. The maximum retry count is the upper limit value for the number of times the migration processing can be re-executed. As the maximum retry count, a default value may be used or a value designated by the administrator may be used.

In a case where the retry count has not reached the maximum retry count (S403: YES), the retry count 1251 is incremented by one, and processing returns to S400. In a case where the retry count has reached the maximum retry count (S403: NO), the processing ends. This is because files, for which migration is still suspended when the maximum retry count is reached, are files that are not to be moved or files for which movement is undesirable.

Figure 20:
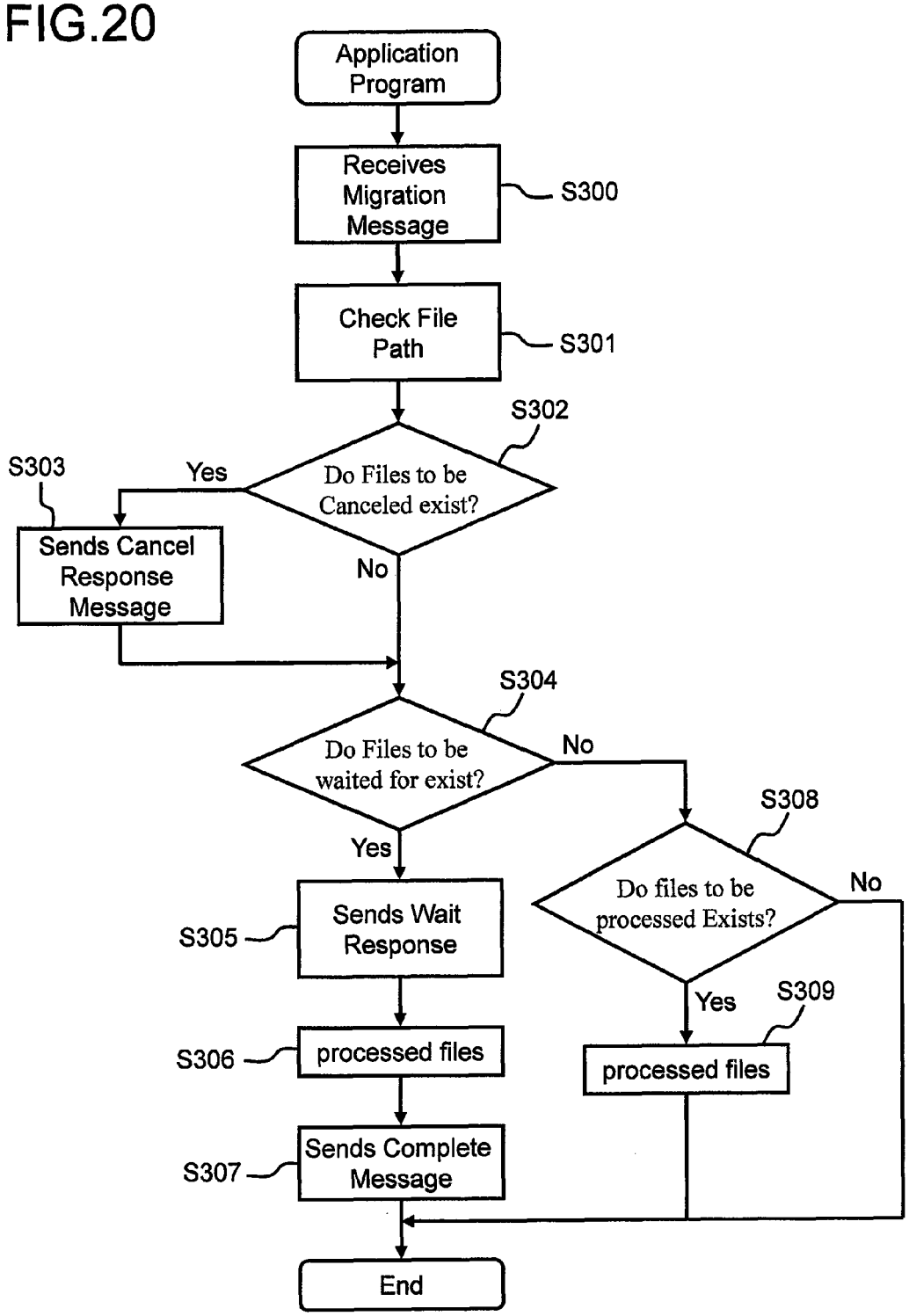
FIG. 20 is a flowchart showing processing in a case where a client computer receives a migration message.
Figure 21:
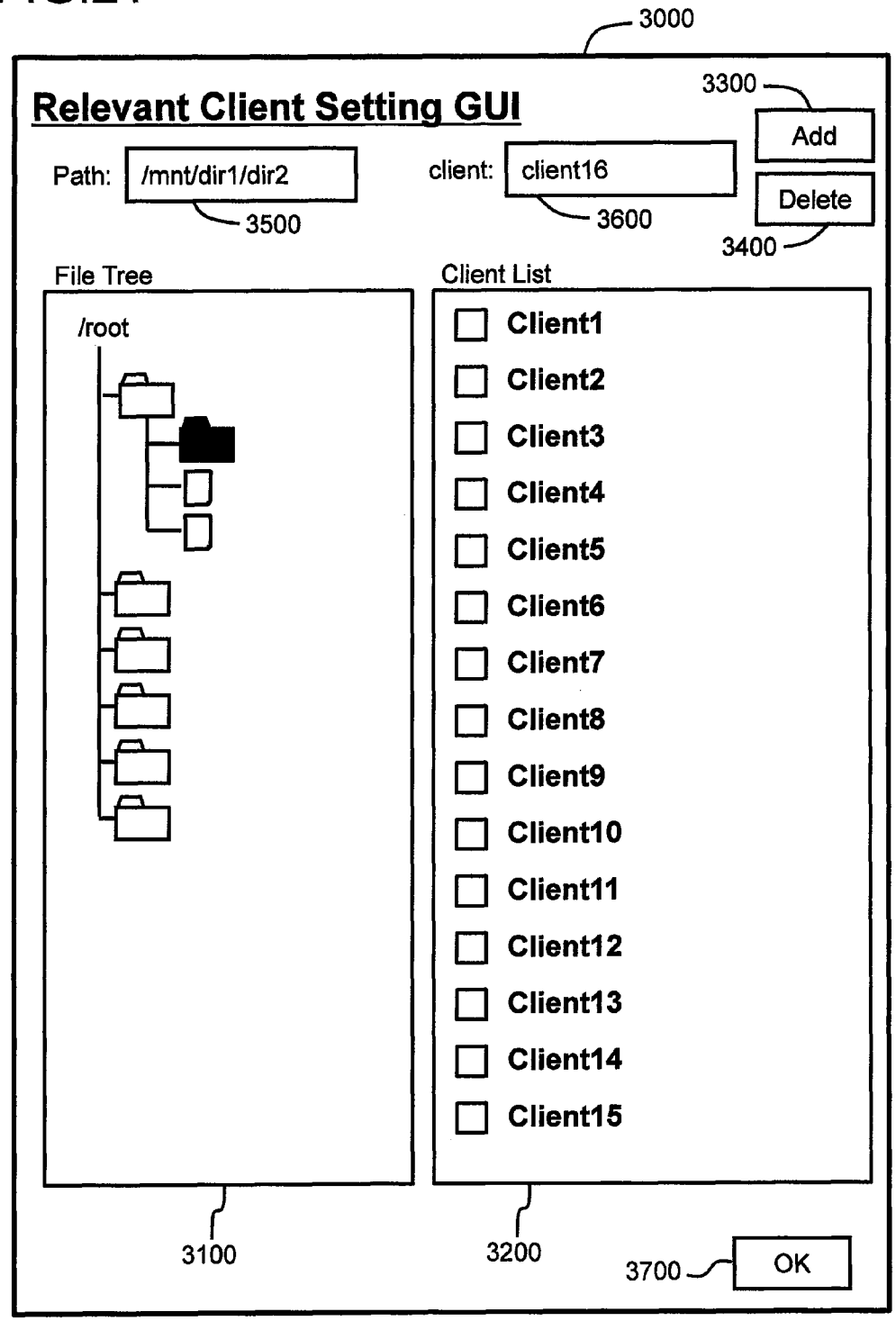
FIG. 21 shows an example of a screen for setting transmission destinations for the migration message.

FIG. 20 is a flowchart showing processing in a case where the application program 1210 receives the migration message 2100.

The application program 1210 receives the migration message 2100 from the file storage apparatus 300 in a case where another client computer 200 directs migration, where the management computer 100 directs migration, or where the file storage apparatus 300 performs migration in accordance with a schedule or the like. When the migration message processing module 1211 receives the migration message 2100 from the file storage apparatus 300, the following processing is started (S300).

The migration message processing module 1211 confirms the export path 2100A and the migration destination type 2100D of the migration message 2100. The migration message processing module 1211 checks whether files associated with the client computer 200 provided with the migration message management module 1211 are migration targets (S301).

The migration message processing module 1211 judges whether or not file migration must be suspended (S302).

In a case where migration must be suspended (S302: YES), the migration message processing module 1211 advances to S303 (described subsequently), and in a case where migration does not need to be suspended (S302: NO), the migration message processing module 1211 advances to S304 (described subsequently).

For example, in a case where a log file updated at regular intervals by the application program 1210 is to be moved to a WORM device or a tape device, the migration message processing module 1211 stops the migration. The migration message processing module 1211 sets a "cancel" state for the export path of the file for which migration is to be suspended, and creates and sends a response message 2200 to the file storage apparatus 300 (S303).

Note that, pre-registering the fact that migration should be suspended for a file may be considered as a method of confirming whether or not a file requires migration suspension.

The file storage apparatus 300 may also be accessed after receiving the migration message 2100 in order to confirm whether a file requires migration suspension. However, in a case where the force bit 2100F in the migration message 2100 has been set to "1", migration is not suspended.

The migration message processing module 1211 judges whether or not there is processing (pre-processing) to be completed before migration starts. As pre-processing to be performed before migration, mention may be made of thumbnail creation processing which uses content management software or a file access GUI or the like, for example.

In a case where it is estimated that the processing that must be performed before migration will not be complete by the migration start time, the migration message processing module 1211 determines that migration of the corresponding file should be postponed (S304). In a case where migration is postponed (S304: YES), the application program 1210 advances to S305 (described subsequently), and when migration is not postponed (S304: NO), the application program 1210 advances to S308.

For example, in a case where a file for which a search index is to be created by the application program 1210 is to be migrated to a tape device or MAID device with a large access response time, migration is postponed until the search index has been created. However, in a case where the force bit 2100F has been set to "1" in the migration message 2100, the migration is not postponed. The method used to determine whether or not migration should be postponed for a file is the same as the method for judging whether or not migration of a file should be suspended.

The migration message processing module 1211 sets the export path of a file for which it is determined in S304 that migration should be postponed to the "wait" status and creates and sends a response message to the file storage apparatus 300.

The migration message processing module 1211 executes pre-processing by means of the application program 1210 (S306). The application program 1210 performs processing required for the migration target file before migration is started.

The application program 1210 directs transmission of a completion message to the migration message processing module 1211 after the pre-processing is complete (S307), and ends the processing.

Furthermore, in a case where it is judged that there is no file for which migration is to be postponed (S304: NO), the migration message processing module 1211 judges whether or not there is processing that is to be executed before migration with respect to the migration target files (S308).

In a case where there is processing to be executed (S308: YES), the application program 1210 advances to S309, and in a case where no such processing exists (S308: NO), the application program 1210 ends the processing. The same method as in S302 can be used to confirm whether there is processing to be executed before migration.

The migration message processing module 1211 executes the processing that is to be executed with respect to the migration target files before migration starts by means of the application program 1210 (S309). The migration message processing module 1211 ends the processing (migration message reception processing) after the processing is complete.

With the computer system of this Example, the administrator is able to make various settings by using the management GUI program 1110 of the management computer 100 or the application management GUI 1220 of the client computer 200.

More specifically, the administrator is able to set the client computers 200 to which the migration message 2100 is to be relayed or is able to make settings by adopting, as a policy, processing for a case where migration processing is suspended by another client computer 200.

FIG. 17 is an explanatory diagram showing a screen 3000 for setting the client computers 200 to which the migration message 2100 is to be sent.

A settings screen 3000, which is displayed by the management GUI program 1110 on the management computer 100, includes a file tree 3100 indicating a settings target file or folder, a client list 3200 for displaying transmission-destination client computers 200, an add button 3300, a delete button 3400, a path name display box 3500, a client computer name input box 3600, and an OK button 3700.

The file tree 3100 models and displays the tree structure of the unified file system. The administrator uses a pointing device to select the settings target file or folder.

The path name display box 3500 displays the file path (or folder path) selected in the file tree 3100. The host name of the client computer 200 is input in the client computer name input box 3600 when adding a client computer 200 to which the migration message 2100 is to be sent.

Note that, in an initial state, each of the client computers 200 displayed in the client list 3200 are the same as the stored content of the client management table 1395 of the file storage apparatus 300. The management GUI program 1110 is capable of acquiring the content of the client management table 1395.

The client list 3200 is a list indicating the client computers 200 which are registered as transmission destinations for the migration message 2100 and which are related to the file or folder selected in the file tree 3100.

The administrator is able to add, to the client list 3200, a client computer 200 that has been entered in the client computer name input box 3600 by pressing the "add" button 3300. In a case where a registered client computer 200 is deleted from the client list 3200, the administrator selects the name of the client computer 200 to be deleted and operates the "delete" button 3300.

In a case where the OK button 3700 is operated, the settings content of the screen 3000 is sent to the file storage apparatus 300. After receiving the settings content, the file storage apparatus 300 edits the client management table 1395 to reflect the settings content.

Figure 22:
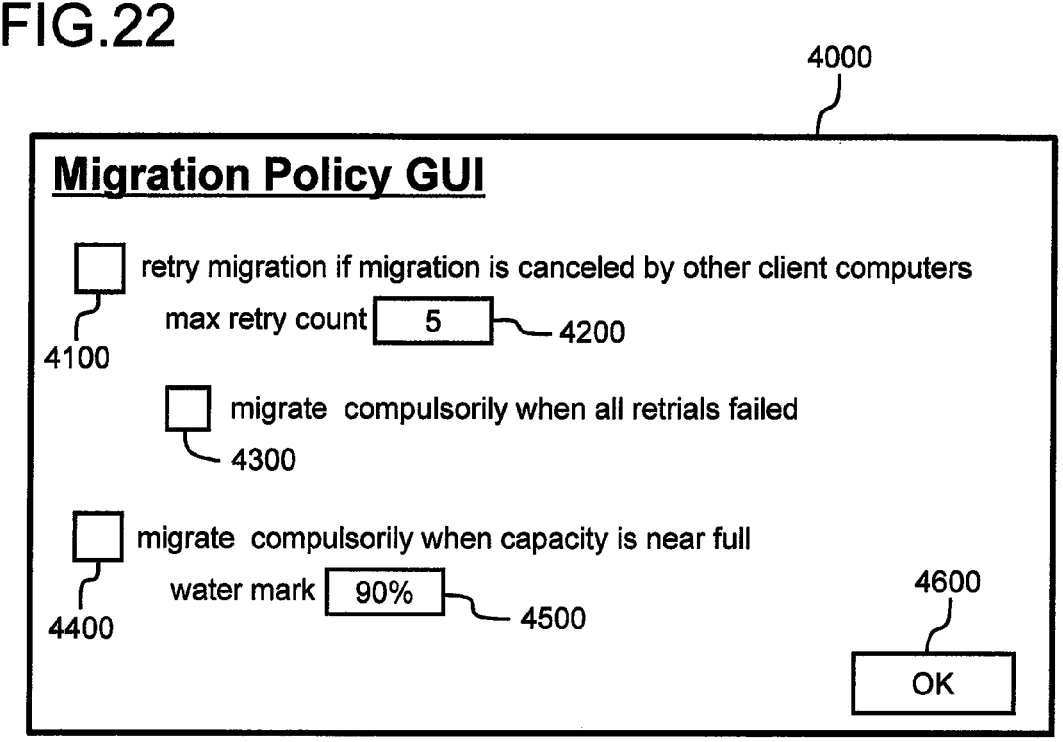
FIG. 22 shows an example of a screen for setting a migration policy.

FIG. 22 is an explanatory diagram showing a settings screen 4000 for setting operation of the application program 1210 in a case where migration is suspended.

The administrator sets the operation when migration suspension processing is to be performed by using the settings screen 4000, which is displayed by either the application management GUI program 1220 on the client computer 200, or by the management GUI program 1110 on the management computer 100. Here, to facilitate the description, a case where the management GUI program 1110 is charged with processing when migration suspension is performed is illustrated.

The settings screen 4000 includes a retry execution checkbox 4100, a retry count input box 4200, a forced migration execution checkbox 4300, an inadequate-capacity forced migration execution checkbox 4400, an inadequate-capacity threshold value input box 4500, and an OK button 4600.

The retry execution checkbox 4100 is used to set whether the migration direction message 2000 is to be resent to the file storage apparatus 300 in a case where migration processing is suspended in accordance with a request from another client computer 200.

The retry count input box 4200 is for setting the maximum retry count in a case where migration is retried.

The forced migration execution checkbox 4300 is for setting whether forced migration is to be performed in a case where migration fails even when migration retries have reached the maximum retry count. When forced migration is set, "1" is set for the force bit of the migration direction message 2000.

The inadequate-capacity forced migration execution checkbox 4400 is for setting whether forced migration is to be performed in a case where the used capacity of the migration-source real file system is equal to or more than a threshold value. In a case where inadequate-capacity forced migration execution has been set, when the used capacity (utilization) of the migration source is equal to or more than the threshold value, the force bit of the migration direction message 2000 is set to "1".

A percentage (utilization) for judging inadequate capacity is set in an inadequate capacity threshold value input box 4500. The settings content of the screen 4000 is reflected in the application program 1210 or the management GUI program 1110 when the OK button 4600 is operated.

According to the present Example, the client computers 200 can be informed in advance that file migration is scheduled by means of the migration message 2100 from the file storage apparatus 300.

Each of the client computers 200 executing migration target file-related processing is therefore capable of executing related processing (search index creation, computer virus scan, and so forth) before file migration is performed.

In addition, the client computers 200 executing migration target file-related processing are capable of requesting that migration of the migration target files be suspended or postponed.

Therefore, according to the present Example, situations where files are unknowingly moved, where the response time drops, or where an update is denied, can be prevented. In other words, in a hierarchical file system, file migration that is transparent to the user can be executed without adversely affecting responsiveness or operability, or the like.

Moreover, in the present Example, the execution period for related processing performed by each client computer 200 can be brought close to the execution period for file migration, thereby prolonging the period over which the results of the related processing are effective. And, the file management sub-system may comprise a plurality of apparatus. For example, another apparatus, different to the file storage apparatus 300 and the management computer 100, may include the migration direction processing module 1341, information needed to process the migration direction processing module 1341 (ex., the hierarchical management table 1370, the file management table 1380, migration management table 1390, the client management table 1395, or copy of the these table), and program to provide a GUI explained in the FIG. 21 and FIG. 22.

INDUSTRIAL APPLICABILITY

Note that the present invention is not limited to the above embodiment. A person skilled in the art is able to make various additions and changes within the scope of the present invention, such as suitably combining the above Examples, for example.

REFERENCE SIGNS LIST

100 Management computer
200 Client computer

300 File storage apparatus
400 Sub-storage apparatus
1110 Management GUI program
1111 Migration processing module
1210 Application program
1211 Migration message processing module
1212 Migration direction processing module
1220 Application management GUI program
1251 Migration file table
1310 Hierarchical management file system program
1320 File service program
1330 File service client program
1340 Migration engine program
1341 Migration direction processing module
1342 Migration processing module
1350 Operating system
1351 Real file system processing module
1360 Storage control program
1370 Hierarchical management table
1380 File management table
1390 Migration management table
1395 Client management table
1410 Real file system processing module
1420 File service program
2000 Migration direction message
2100 Migration message
2200 Response message

The invention claimed is:

1. A file storage having a first file system, which is coupled to one or more sub-storages, one or more client computers and one or more management computers via a network, comprising:
a hierarchical management unit which provides the first file system and a unified file system comprised of one or more second file systems that the one or more sub-storages have, with the one or more client computers;
a file service unit which receives an access request from the one or more client computers to the unified file system, converts the access request to an access request to the first file system or the one or more second file systems that compose the unified file system, and accesses any one of the first file system or the one or more second file systems based on the converted access request;
an information storage unit which holds client management information for identifying one or more client computers which share each file or each folder for each file or each folder in the unified file system;
a migration processing unit which migrates a target file or a target folder which is stored in any of the first file system or the one or more second file systems based on a migration instruction of the target file or the target folder in the unified file system, to the other of the first file system or second file systems; and
a migration information notification unit which specifies one or more client computers which share the target file or the target folder by use of the client management information before migration execution of the target file or the target folder and notifies migration information as to migration of the target file or the target folder for each of the specified one or more client computers,
wherein:
the migration processing unit determines a start time for starting migration of the target file or the target folder,
the migration information notification unit notifies each of the specified one or more client computers of the migration information prior to a predetermined time other than the start time, and
the migration processing unit waits for the start time, and when receiving a migration suspension request or a migration postponement request from any of the specified one or more client computers while waiting, suspends or postpones migration of the target file or the target folder.

2. The file storage according to claim 1,
wherein the migration processing unit receives the migration instruction issued from any one of the one or more client computers or the one or more management computers.

3. The file storage according to claim 1,
wherein the migration instruction is generated in the file storage according to a migration schedule or migration policy set in advance in the file storage.

4. The file storage according to claim 1, wherein:
the migration processing unit receives the migration instruction issued from any of the one or more client computers; and
the migration information notification unit notifies a client computer other than the client computer which issues the migration instruction among one or more client computers which shares the target file or the target folder of the migration information.

5. The file storage according to claim 1, wherein:
the predetermined time is for the specified one or more client computers which have been notified of the migration information, to execute processing which is to be completed before migration of the target file or the target folder is performed, or to send a migration suspension request or a migration postponement request of the target file or the target folder to the file storage.

6. The file storage according to claim 1, wherein:
the migration information includes information showing each of the target file or the target folder, the first file system type or the second file system type of a migration destination, and the start time.

7. The file storage according to claim 1, wherein:
in a case where the migration direction includes a forced execution instruction, the migration processing unit executes migration of the target file or the target folder at the start time even when receiving the migration suspension request or the migration postponement request.

8. The file storage according to claim 1, wherein:
the migration processing unit executes the migration of the target file or the target folder other than the target file or the target folder for which migration is suspended or postponed, based on a migration instruction of the target files or the target folders in the unified file system, at the start time.

9. The file storage according to claim 1, wherein:
the migration processing unit, when receiving a pre-processing completion notification from a client computer which sends the migration postponement request, executes migration of the target file or the target folder.

10. The file storage according to claim 1, wherein:
the first file system and at least one of the one or more second file systems are different in characteristics;
as the migration instruction, migration among file systems in which characteristics are different from each other is instructed; and
the migration information includes characteristic information of a file system of migration destination.

11. A migration control method by a file storage having a first file system, which is coupled to one or more sub-storages, one or more client computers and one or more management computers via a network, comprising the steps of:

providing the first file system and a unified file system comprised of one or more second file systems that the one or more sub-storages have, with the one or more client computers;

holding client management information for identifying one or more client computers which share each file or each folder for each file or each folder in the unified file system;

determining a start time of migrating a target file or a target folder which are stored in any of the first file system or the one or more second file systems based on a migration instruction of the target file or the target folder in the unified file system, to the other of the first file system or second file systems; and specifying one or more client computers which share the target file or the target folder by use of the client management information prior to a predetermined time other than the start time;

notifying migration information as to migration of the target file or the target folder for each of the specified one or more client computers; and executing migration of the target file or the target folder at the start time, wherein the migration of the target file or the target folder is suspended or postponed when a migration suspension request or a migration postponement request of the target file or the target folder is received from any of the specified one or more client computers.

12. The migration control method according to claim 11, further comprising the step of:

receiving the migration instruction issued from any one of the one or more client computers or the one or more management computers.

13. The migration control method according to claim 11, further comprising the step of:

generating the migration instruction in the file storage according to migration schedule or migration policy set in advance in the file storage.

14. The migration control method according to claim 11, further comprising the step of:

receiving the migration instruction issued from any of the one or more client computers, wherein:

in the migration information notification step, notifying a client computer other than the client computer which issues the migration instruction among one or more client computers which shares the target file or the target folder of the migration information.

15. The migration control method according to claim 11, wherein;

the predetermined time is for the specified one or more client computers which have been notified of the migration information, to execute processing which is to be completed before the migration of the target file or the target folder is performed, or to send a migration suspension request or a migration postponement request of the target file or the target folder to the file storage.

16. The migration control method according to claim 11, wherein the migration information includes information showing each of the target file or the target folder, the first file system type or the second file system type of a migration destination, and the start time.

17. The migration control method according to claim 11, wherein:

in a case where the migration direction includes the forced execution instruction, the migration of the target file or the target folder is executed at the start time even when receiving the migration suspension request or the migration postponement request.

18. The migration control method according to claim 11, wherein:

the migration of the target file or the target folder other than the target file or the target folder which migration is suspended or postponed is executed at the start time, based on a migration instruction of the target files or the target folders in the unified file system.

19. The migration control method according to claim 11, further comprising the step of:

when receiving a pre-processing completion notification from a client computer which sends the migration postponement request, executing migration of the target file or the target folder.

\* \* \* \* \*